United States Patent
Fukuchi et al.

(10) Patent No.: US 8,977,055 B2
(45) Date of Patent: Mar. 10, 2015

(54) INFORMATION PROCESSING DEVICE, OBJECT RECOGNITION METHOD, PROGRAM, AND TERMINAL DEVICE

(75) Inventors: Masaki Fukuchi, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 13/368,816

(22) Filed: Feb. 8, 2012

(65) Prior Publication Data
US 2012/0243739 A1    Sep. 27, 2012

(30) Foreign Application Priority Data
Mar. 25, 2011 (JP) ................................. 2011-067961

(51) Int. Cl.
G06K 9/00 (2006.01)
G06K 9/46 (2006.01)
G06F 17/30 (2006.01)

(52) U.S. Cl.
CPC .......... G06K 9/00671 (2013.01); G06K 9/4661 (2013.01); G06F 17/30247 (2013.01); G06F 17/3087 (2013.01)
USPC ........................................................ 382/181

(58) Field of Classification Search
None
See application file for complete search history.

(56) References Cited

U.S. PATENT DOCUMENTS

| | | | |
|---|---|---|---|
| 6,389,181 B2 * | 5/2002 | Shaffer et al. ................. | 382/305 |
| 6,792,136 B1 * | 9/2004 | Niesen ........................... | 382/118 |
| 6,961,061 B1 * | 11/2005 | Johnson et al. ............... | 345/473 |
| 7,221,809 B2 * | 5/2007 | Geng ............................. | 382/280 |
| 7,349,830 B2 * | 3/2008 | Gilbert et al. ..................... | 703/2 |
| 7,496,228 B2 * | 2/2009 | Landwehr et al. ............ | 382/170 |
| 7,756,866 B2 * | 7/2010 | Bhalotia et al. ............... | 707/723 |
| 7,860,854 B2 * | 12/2010 | Lipson et al. ................. | 707/707 |
| 8,160,309 B1 * | 4/2012 | Tzur et al. ..................... | 382/118 |
| 8,249,303 B2 * | 8/2012 | Nitanda ........................ | 382/104 |
| 8,332,429 B2 * | 12/2012 | Poirier et al. ................. | 707/781 |
| 8,334,921 B2 * | 12/2012 | Hiratsuka ................ | 348/333.12 |
| 8,503,767 B2 * | 8/2013 | Sun et al. ...................... | 382/159 |
| 8,503,800 B2 * | 8/2013 | Blonk et al. .................. | 382/226 |
| 8,543,940 B2 * | 9/2013 | Singhal et al. ............... | 715/809 |
| 2005/0004897 A1 * | 1/2005 | Lipson et al. ..................... | 707/3 |
| 2007/0043690 A1 * | 2/2007 | Inakoshi et al. .................. | 707/1 |

(Continued)

OTHER PUBLICATIONS

D. G. Lowe, "Distinctive Image Features from Scale-Invariant Keypoints", the International Journal of Computer Vision, 28 pages (2004).

(Continued)

*Primary Examiner* — Jon Chang
*Assistant Examiner* — Oneal R Mistry
(74) *Attorney, Agent, or Firm* — Sherr & Jiang, PLLC

(57) ABSTRACT

There is provided an information processing device including a database that stores feature quantities of two or more images, the database being configured such that identification information for identifying an object in each image and an attribute value related to a lighting condition under which the object was imaged are associated with a feature quantity of each image, an acquisition unit configured to acquire an input image captured by an imaging device, and a recognition unit configured to recognize an object in the input image by checking a feature quantity determined from the input image against the feature quantity of each image stored in the database. The feature quantities stored in the database include feature quantities of a plurality of images of an identical object captured under different lighting conditions.

13 Claims, 19 Drawing Sheets

(56) References Cited

U.S. PATENT DOCUMENTS

| | | | |
|---|---|---|---|
| 2008/0101723 A1* | 5/2008 | Kansal | 382/284 |
| 2009/0193055 A1* | 7/2009 | Kuberka et al. | 707/104.1 |
| 2010/0002941 A1* | 1/2010 | Fonseca et al. | 382/209 |
| 2012/0005221 A1* | 1/2012 | Ickman et al. | 707/769 |
| 2012/0045090 A1* | 2/2012 | Bobbitt et al. | 382/103 |
| 2012/0051726 A1* | 3/2012 | King | 396/4 |

OTHER PUBLICATIONS

M. Oezuysal, "Fast Keypoint Recognition using Random Ferns", IEEE Transactions on Pattern Analysis and Machine Intelligence, vol. 32, Nr.3, pp. 448-461 (2010).

* cited by examiner

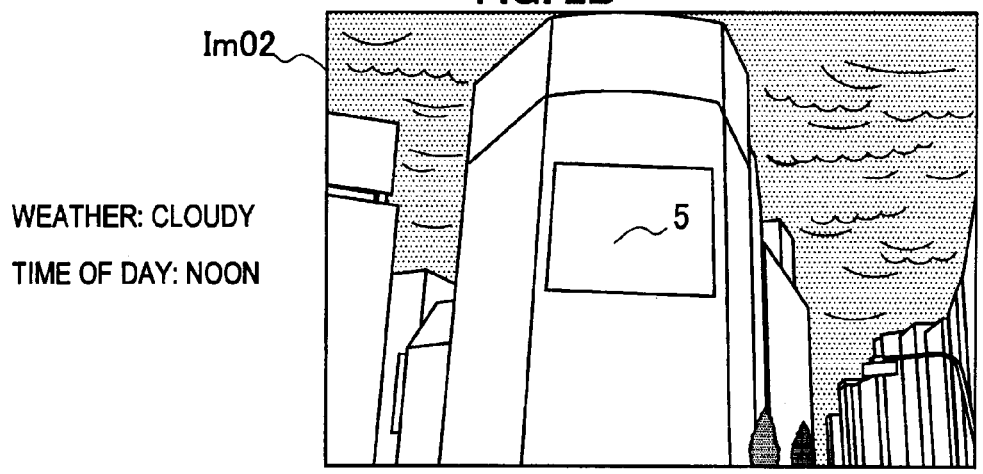
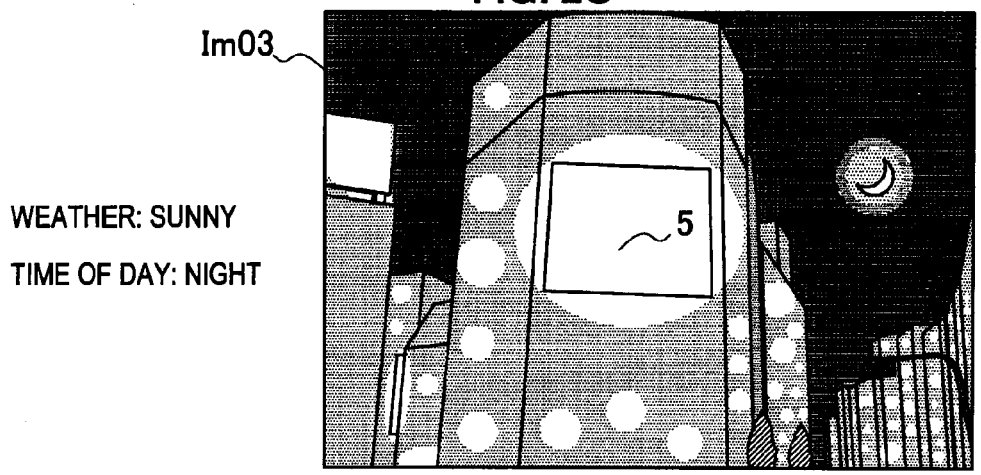

FIG. 5

| OBJECT ID | FEATURE QUANTITY ID | PLACE | DATE | TIME | WEATHER | FEATURE QUANTITY SET |
|---|---|---|---|---|---|---|
| B1 | F11 | X1 | Feb 1 | 8:00 | CLEAR AND SUNNY | .. |
|  | F12 | X1 | Jan 19 | 13:30 | CLOUDY | .. |
|  | F13 | X1 | Dec 19 | 22:00 | SUNNY | .. |
|  | .. | .. | .. | .. | .. | .. |
| B2 | F21 | X2 | Apr 21 | 16:30 | SUNNY | .. |
|  | .. | .. | .. | .. | .. | .. |
| B3 | F31 | any | any | any | SUNNY | .. |
| .. | .. | .. | .. | .. | .. | .. |

230

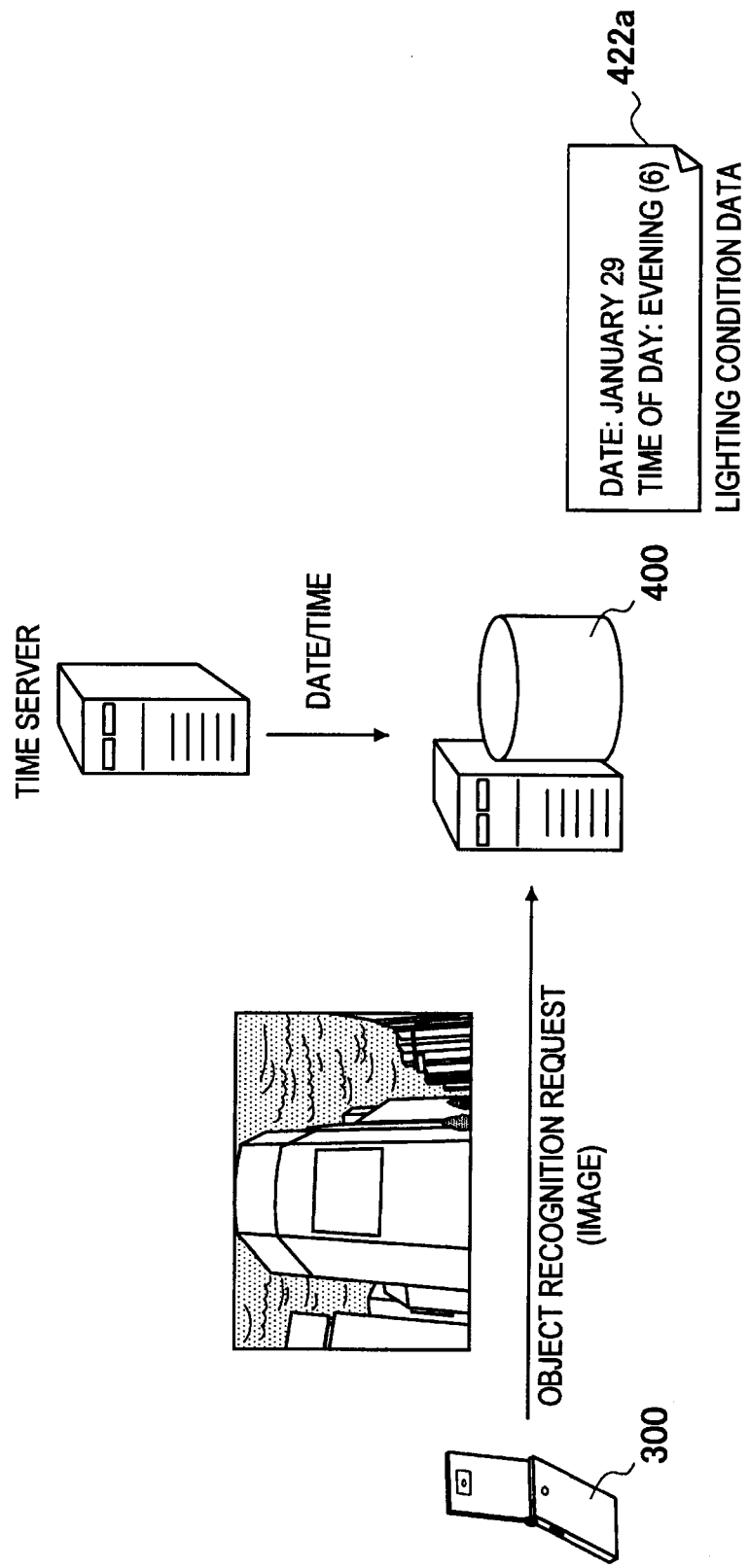

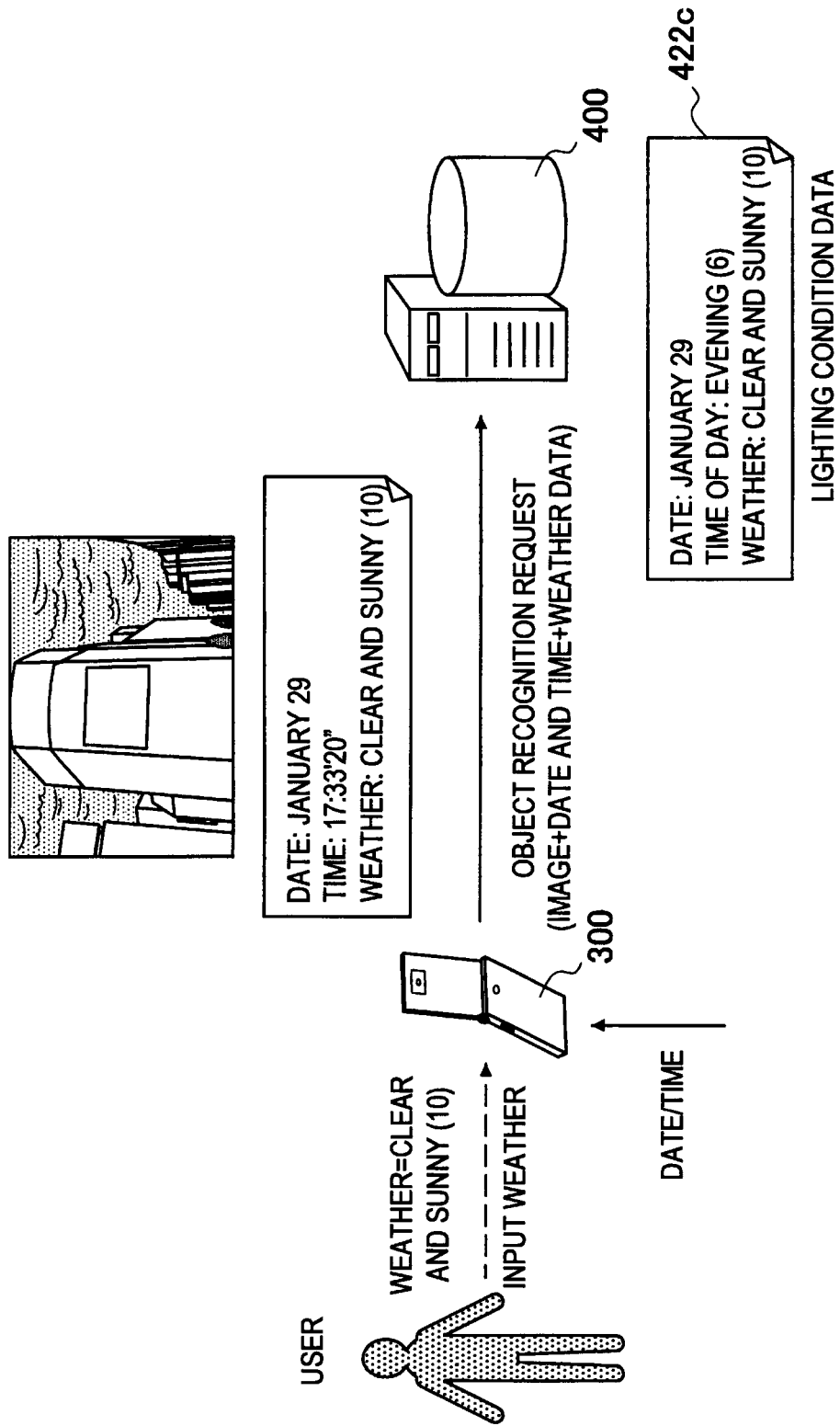

FIG. 10

| OBJECT ID | FEATURE QUANTITY ID | PLACE | LIGHTING CONDITION ATTRIBUTES | | | FEATURE QUANTITY SET |
|---|---|---|---|---|---|---|
| | | | TIME CONDITIONS | | WEATHER | |
| | | | DATE | TIME OF DAY | | |
| B1 | F11 | $X_{11}$ | Feb 1 | 3 | 10 | ... |
| | F12 | $X_{12}$ | Jan 19 | 5 | 3 | ... |
| | F13 | $X_{13}$ | Dec 19 | 7 | 8 | ... |
| | .. | .. | .. | .. | .. | .. |
| B2 | F21 | $X_{21}$ | Apr 21 | 6 | 8 | ... |
| | .. | .. | .. | .. | .. | .. |
| B3 | F31 | any | any | any | 9 | ... |
| .. | .. | .. | .. | .. | .. | .. |

| AREA ID | LIGHTING CONDITION SEGMENT | OBJECT ID | FREQUENCY |
|---|---|---|---|
| $A_1$ | $L_1$ | B2 | 50 |
| | | B5 | 10 |
| | | B7 | 8 |
| | | ⋮ | ⋮ |
| | $L_2$ | B2 | 40 |
| | | ⋮ | ⋮ |
| | ⋮ | ⋮ | ⋮ |
| $A_2$ | $L_1$ | B1 | 60 |
| | | B3 | 5 |
| | | ⋮ | ⋮ |
| | | | |
| | | | |

FREQUENCY COUNT DATA

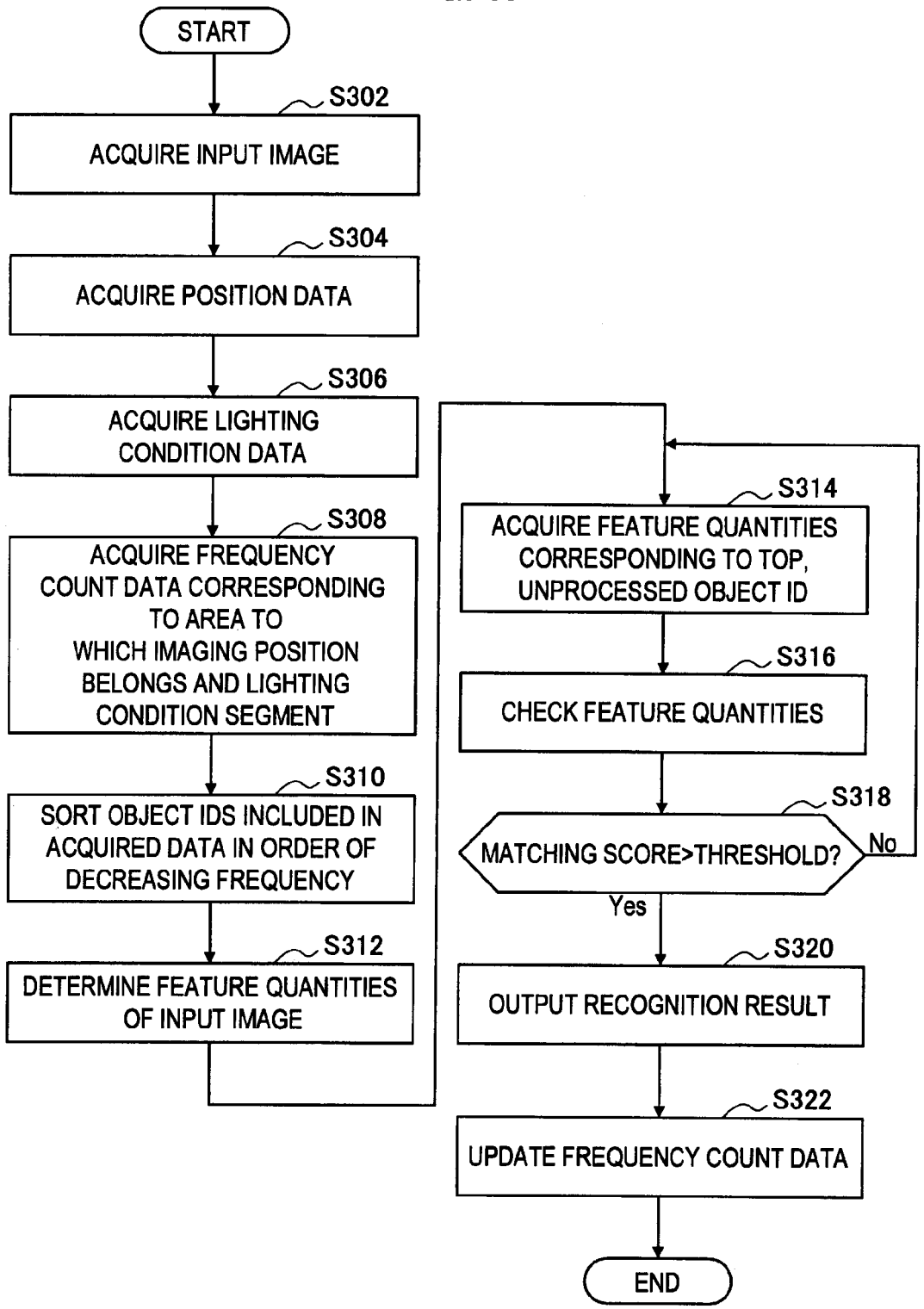

INFORMATION PROCESSING DEVICE, OBJECT RECOGNITION METHOD, PROGRAM, AND TERMINAL DEVICE

BACKGROUND

The present disclosure relates to an information processing device, an object recognition method, a program, and a terminal device.

With the advancement of image recognition technology in recent years, it has become possible to recognize the position and attitude of an object in an image input from a camera, through matching of image feature quantities. One application of such object recognition is an AR (Augmented Reality) application. In the AR application, a variety of information (e.g., advertising information, navigation information, or information for games) can be displayed such that it is overlaid on an image of a building, a road, or other objects existing in the real world.

Reference 1 (David G. Lowe, "Distinctive Image Features from Scale-Invariant Keypoints", the International Journal of Computer Vision, 2004) proposes a method called SIFT (Scale Invariant Feature Transform) for extracting feature quantities of an image, the method having increased robustness against noise in the image, changes in scale, and rotation. Reference 2 (Mustafa Oezuysal, "Fast Keypoint Recognition using Random Ferns", IEEE Transactions on Pattern Analysis and Machine Intelligence, Vol. 32, Nr.3, pp. 448-461, March 2010) proposes a method called Random Ferns with a lower processing cost, the method being adapted to extract feature quantities of an image using a portable terminal with low processing performance or the like.

SUMMARY

However, in a scene where object recognition is actually used, changes in the lighting conditions under which an image is captured are big factors to decrease the accuracy of recognition. For example, the way in which an outdoor object looks changes significantly depending on conditions such as seasons, time of day, or weather. As a result, a phenomenon can occur in which, when an AR application attempts to overlay information on an outdoor object, feature quantities determined from the input image do not match the feature quantities registered in advance, with the result that the object cannot be recognized accurately. Although feature quantities determined in accordance with SIFT described in Reference 1 are robust against changes in the lighting conditions to a certain extent, it would be difficult to sufficiently absorb the aforementioned significant changes in the way in which an object looks. Further, it is typically difficult to completely model various changes in the outdoor lighting conditions.

In light of the foregoing, it is desirable to provide an information processing device, an object recognition method, a program, and a terminal device that can accurately recognize an object in an image in a circumstance where the lighting conditions under which an image is captured change.

According to an embodiment of the present disclosure, there is provided an information processing device including a database that stores feature quantities of two or more images, the database being configured such that identification information for identifying an object in each image and an attribute value related to a lighting condition under which the object was imaged are associated with a feature quantity of each image, an acquisition unit configured to acquire an input image captured by an imaging device, and a recognition unit configured to recognize an object in the input image by checking a feature quantity determined from the input image against the feature quantity of each image stored in the database. The feature quantities stored in the database include feature quantities of a plurality of images of an identical object captured under different lighting conditions.

The acquisition unit may further acquire lighting condition data representing a lighting condition under which the input image was captured, the information processing device may further include a filtering unit configured to extract from the feature quantities of the two or more images stored in the database feature quantities of images captured under lighting conditions that are close to the lighting condition represented by the lighting condition data, and the recognition unit may check the feature quantities of the images extracted by the filtering unit against the feature quantity determined from the input image.

The lighting condition may include a first condition related to a weather in which each image was captured.

The acquisition unit may acquire the lighting condition data for the first condition on the basis of position data representing a position of the imaging device that has captured the input image and date and time when the input image was captured or acquired.

The lighting condition may include a second condition related to date or time when each image was captured.

The information processing device may further include a communication unit configured to receive the input image transmitted from a terminal device and transmit to the terminal device information about an object recognized by the recognition unit.

The information processing device may further include a communication unit configured to receive the input image transmitted from a terminal device and transmit to the terminal device information about an object recognized by the recognition unit. The acquisition unit may acquire the lighting condition data from a device different from the terminal device.

In the database, an attribute value representing a position of an object in each image may further be associated with the feature quantity of each image, the acquisition unit may further acquire position data representing a position of the imaging device that has captured the input image, and the filtering unit may extract only feature quantities of images for objects captured at positions that are close to the position of the imaging device represented by the position data.

The acquisition unit may further acquire at least one of position data representing a position of the imaging device that has captured the input image or lighting condition data representing a lighting condition under which the input image was captured, the information processing device may further include a counting unit configured to count a frequency of recognition of each object performed by the recognition unit per predetermined unit related to the position of the imaging device or the lighting condition, and the recognition unit may refer to the frequencies counted by the counting unit for the position of the imaging device or the lighting condition corresponding to a newly acquired input image, and preferentially checks feature quantities of images of objects with high frequencies against the feature quantity determined from the input image.

According to still another embodiment of the present disclosure, there is provided an object recognition method in an information processing device including a database that stores feature quantities of two or more images, the database being configured such that identification information for identifying an object in each image and an attribute value related to a lighting condition under which the object was imaged are associated with a feature quantity of each image, and the feature quantities stored in the database including feature quantities of a plurality of images of an identical object captured under different lighting conditions, the object recognition method including acquiring an input image captured by an imaging device, and recognizing an object in the input image by checking a feature quantity determined from the input image against the feature quantity of each image stored in the database.

According to still another embodiment of the present disclosure, there is provided a program for causing a computer that controls an information processing device including a database that stores feature quantities of two or more images, the database being configured such that identification information for identifying an object in each image and an attribute value related to a lighting condition under which the object was imaged are associated with a feature quantity of each image, to function as an acquisition unit that acquires an input image captured by an imaging device, and a recognition unit configured to recognize an object in the input image by checking a feature quantity determined from the input image against the feature quantity of each image stored in the database. The feature quantities stored in the database include feature quantities of a plurality of images of an identical object captured under different lighting conditions.

According to yet another embodiment of the present disclosure, there is provided a terminal device including a communication unit configured to communicate with an information processing device including a database that stores feature quantities of two or more images, the database being configured such that such that identification information for identifying an object in each image and an attribute value related to a lighting condition under which the object was imaged are associated with a feature quantity of each image, and the database storing feature quantities of a plurality of images of an identical object captured under different lighting conditions, and a control unit configured to transmit from the communication unit to the information processing device an image captured by an imaging device or a feature quantity determined from the captured image, and data about a lighting condition under which the image was captured.

The control unit may, when executing an augmented reality application, transmit from the communication unit to the information processing device the captured image or the feature quantity and the data about the lighting condition.

As described above, the information processing device, the object recognition method, the program, and the terminal device in accordance with the present disclosure can accurately recognize an object in an image in a circumstance where the lighting conditions under which an image is captured change.

BRIEF DESCRIPTION OF THE DRAWINGS

FIG. 2A is an explanatory diagram showing a first example of an input image;

FIG. 2B is an explanatory diagram showing a second example of an input image;

FIG. 2C is an explanatory diagram showing a third example of an input image;

FIG. 5 is an explanatory diagram showing an exemplary structure of a database in accordance with the first embodiment;

FIG. 9A is an explanatory diagram illustrating a first example of a method of acquiring lighting condition data;

FIG. 9C is an explanatory diagram illustrating a third example of a method of acquiring lighting condition data;

FIG. 10 is an explanatory diagram showing an exemplary structure of a database in accordance with the second embodiment;

FIG. 16 is an explanatory diagram showing an exemplary structure of frequency count data; and FIG. 17 is a flowchart showing an exemplary flow of an object recognition process in accordance with the third embodiment.

DETAILED DESCRIPTION OF THE EMBODIMENTS

Figure 1:
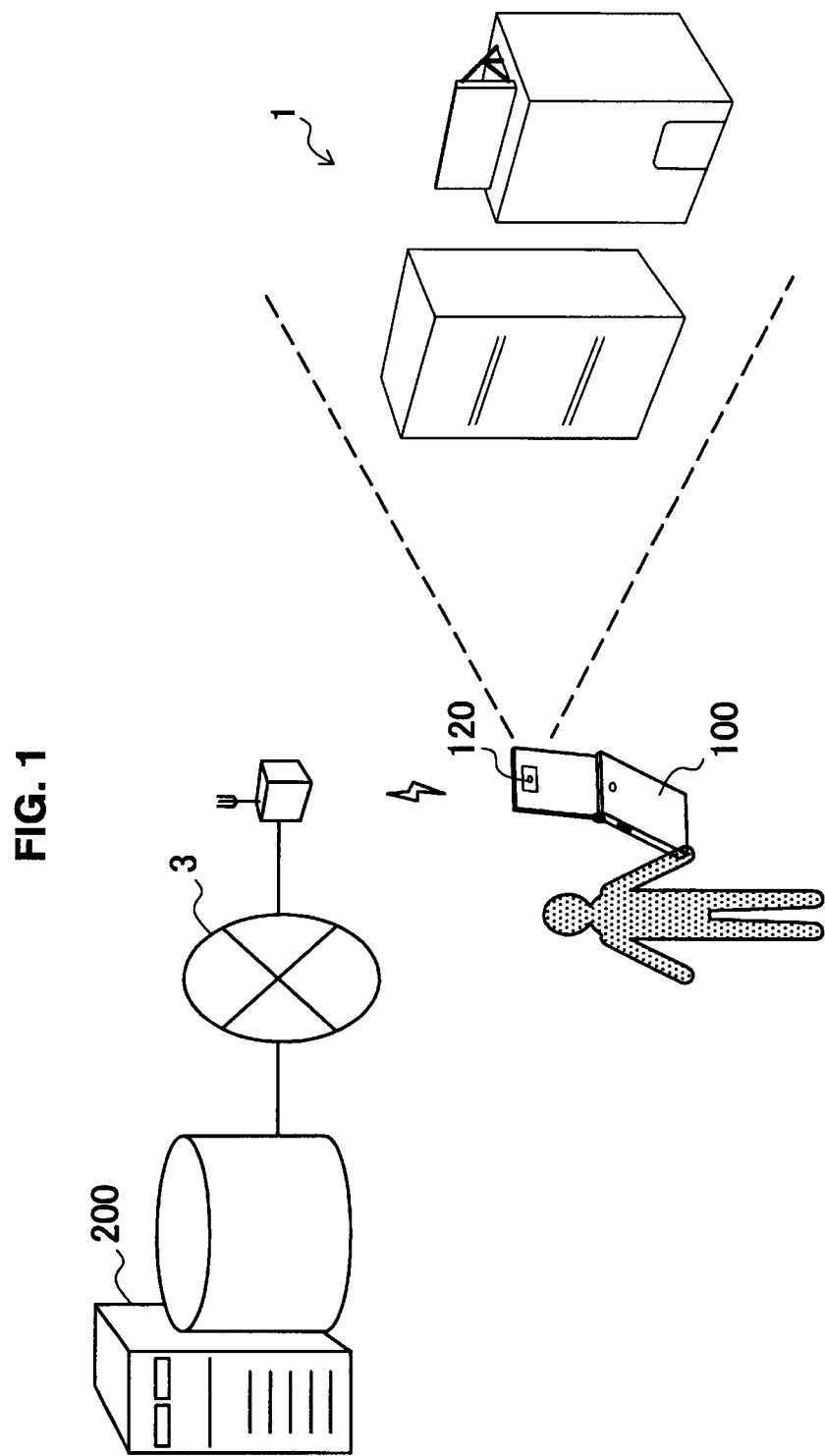
FIG. 1 is an explanatory diagram showing an overview of an object recognition system to which the present technology can be applied.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

The "DETAILED DESCRIPTION OF THE EMBODIMENTS" will be described in the following order.

1. First Embodiment
1-1. System Overview
1-2. Exemplary Configuration of Terminal Device
1-3. Exemplary Configuration of Server
1-4. Process Flow
1-5. Conclusion of First Embodiment
2. Second Embodiment
2-1. Exemplary Configuration of Terminal Device
2-2. Exemplary Configuration of Server
2-3. Process Flow
2-4. Conclusion of Second Embodiment
3. Third Embodiment
3-1. Exemplary Configuration of Server 3-2. Process Flow
3-3. Conclusion of Third Embodiment <1. First Embodiment>

[1-1. System Overview]

FIG. 1 is an explanatory diagram showing an overview of an object recognition system to which the technology disclosed in this specification can be applied. Referring to FIG. 1, an object recognition system 1 in accordance with the first embodiment is shown. The object recognition system 1 includes a terminal device 100 and an object recognition server 200.

The terminal device 100 is a device that transmits to the object recognition server 200 an image to be subjected to object recognition. The terminal device 100 may be a portable terminal carried by a user, such as a smartphone or a PDA (Personal Digital Assistant). Alternatively, the terminal device 100 may be other types of device such as a PC (Personal Computer), a digital home electrical appliance, a game machine, or a digital camera.

In the example of FIG. 1, the terminal device 100 has an imaging device 120. The imaging device 120 generates an image by imaging a real space 1. The terminal device 100 transmits the image generated by the imaging device 120 to the object recognition server 200. Then, the terminal device 100 receives from the object recognition server 200 information about an object in the transmitted image. The terminal device 100 uses the information received from the object recognition server 200 for an AR application or other types of applications, for example.

Note that the imaging device 120 may be a device provided separately from the terminal device 100. For example, the terminal device 100 may acquire an image captured with a digital still camera via a connecting wire or a removable medium such as a USB (Universal Serial Bus), and transmit the acquired image to the object recognition server 200.

The object recognition server 200 is an information processing device that provides an object recognition service to the terminal device 100. The object recognition server 200 is connected to a network 3, and communicates with the terminal device 100. The network 3 can be the Internet or a private network such as an intranet. The object recognition server 200 receives an image from the terminal device 100 and recognizes an object in the received image. Then, the object recognition server 200 transmits information about the recognized object to the terminal device 100.

Object recognition by the object recognition server 200 is performed on the basis of checking of image feature quantities. The object recognition server 200 has stored in its database the feature quantities of images of various objects existing in the real space, and recognizes an object in an input image received from the terminal device 100 by checking the feature quantities of the input image against the feature quantities of each image in the database.

FIGS. 2A to 2C each show an example of an input image transmitted from the terminal device 100 to the object recognition server 200. Each of an input image Im01 shown in FIG. 2A, an input image Im02 shown in FIG. 2B, and an input image Im03 shown in FIG. 2C is an image of an identical object 5. The object 5 is an outdoor building. However, the lighting conditions under which the input images Im01, Im02, and Imp03 were captured vary, and the way in which the object 5 in each image looks also varies. For example, the input image Im01 is an image captured in the morning on a sunny day. In the input image Im01, the object 5 has a shadow casted by another building. The input image Im02 is an image captured at noon on a cloudy day. In the input image Im02, the object 5 has no shadow casted by another building. The input image Im03 is an image captured at night on a sunny day. In the input image Im03, light from a plurality of lightings is reflected by the object 5.

When an image captured in a circumstance where the lighting conditions change as described above is input, there will be a big difference between the feature quantities determined from the input image and the feature quantities of an object image learned in advance. Thus, a phenomenon can occur in which an object in an input image that has been captured under given lighting conditions cannot be recognized accurately. When an object in an input image cannot be recognized accurately, an application, which is provided on the basis of the result of object recognition, becomes difficult to be operated normally. Thus, in this specification, a technology that enables robust recognition of an object in an image even in a circumstance where the lighting conditions under which an image is captured change will be hereinafter described in detail.

[1-2. Exemplary Configuration of Terminal Device]

Figure 3:
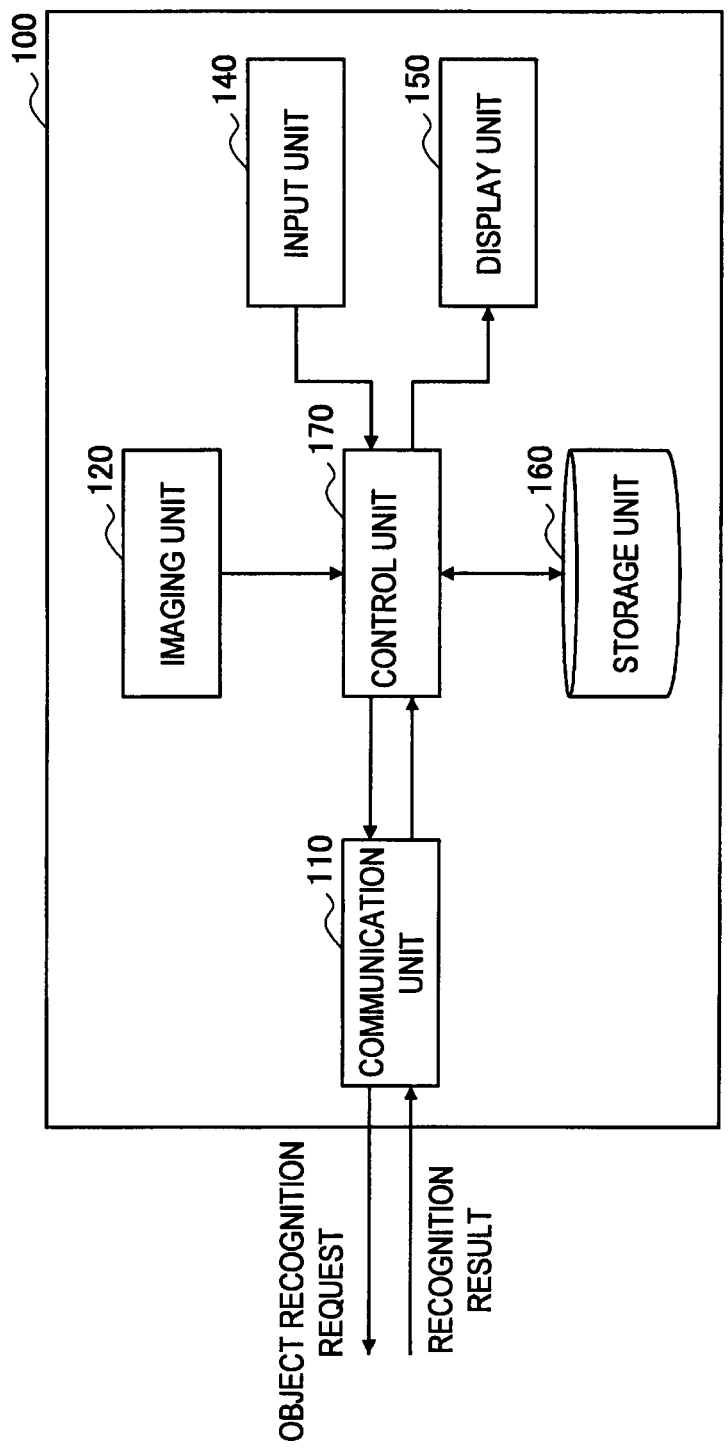
FIG. 3 is a block diagram showing an exemplary configuration of a terminal device in accordance with the first embodiment.

FIG. 3 is a block diagram showing an exemplary configuration of the terminal device 100 in accordance with the first embodiment. Referring to FIG. 3, the terminal device 100 includes a communication unit 110, an imaging unit 120, an input unit 140, a display unit 150, a storage unit 160, and a control unit 170.

(Communication Unit)

The communication unit 110 communicates with the object recognition server 200 under the control of the control unit 170. For example, the communication unit 110 transmits an object recognition request (described below) to the object recognition server 200. The object recognition request can include an input image, which is to be subjected to object recognition, and feature quantities determined from the input image. In addition, the communication unit 110 receives a result of object recognition transmitted from the object recognition server 200 in response to the object recognition request.

(Imaging Unit)

The imaging unit 120 is a camera module corresponding to the imaging device 120 exemplarily shown in FIG. 1. The imaging unit 120 generates an image by imaging a real space using an image sensor such as a CCD (Charge Coupled Device) or a CMOS (Complementary Metal Oxide Semiconductor).

(Input Unit)

The input unit 140 is an input device used by a user to operate the terminal device 100 or input information to the terminal device 100. The input unit 140 can include, for example, a keyboard, a keypad, a mouse, a button, a switch, or a touch panel. The input unit 140 may also include a gesture recognition module that recognizes a gesture of the user in the image, or an audio recognition module that recognizes an audio command uttered by the user.

(Display Unit)

The display unit 150 is a display module including a LCD (Liquid Crystal Display), OLED (Organic Light-Emitting Diode), or CRT (Cathode Ray Tube). On the screen of the display unit 150, an image of an application provided on the basis of a result of object recognition received by the communication unit 110 (e.g., an image obtained by overlaying an AR object on a particular object in the captured image) is displayed. The display unit 150 may be part of the terminal device 100, or be provided separately from the terminal device 100. In addition, the display unit 150 may be a HMD (Head Mounted Display) worn by a user.

(Storage Unit)

The storage unit 160 stores programs and data for processes performed by the terminal device 100, using a storage medium such as semiconductor memory or a hard disk. For example, the storage unit 160 stores an image output from the imaging unit 120. The storage unit 160 also stores information about an object in the input image, received by the communication unit 110 from the object recognition server 200.

(Control Unit)

The control unit 170 corresponds to a processor such as a CPU (Central Processing Unit) or a DSP (Digital Signal Processor). The control unit 170 causes the overall functions of the terminal device 100 to operate by executing the programs stored in the storage unit 160 or another storage medium. For example, the control unit 170, when an AR application is activated by a user via the input unit 140, causes the imaging unit 120 to capture an image of a real space. Next, the control unit 170 causes the communication unit 110 to transmit an object recognition request to the object recognition server 200. The object recognition request can include, as an input image, an image captured by the imaging unit 120 (or another image). Alternatively, the control unit 170 may determine feature quantities from the captured image and cause the object recognition request to include the determined feature quantities. The control unit 170, upon receiving from the object recognition server 200 information about an object in the input image as a result of object recognition, operates an AR application on the basis of the information. The information about the object in the input image may be, for example, ID of the object in the input image, the position and attitude of the object, additional information to be overlaid/displayed on the object in the input image, or the like. Then, the control unit 170 generates an image of the AR application, and displays the generated image on the display unit 150.

[1-3. Exemplary Configuration of Server]

Figure 4:
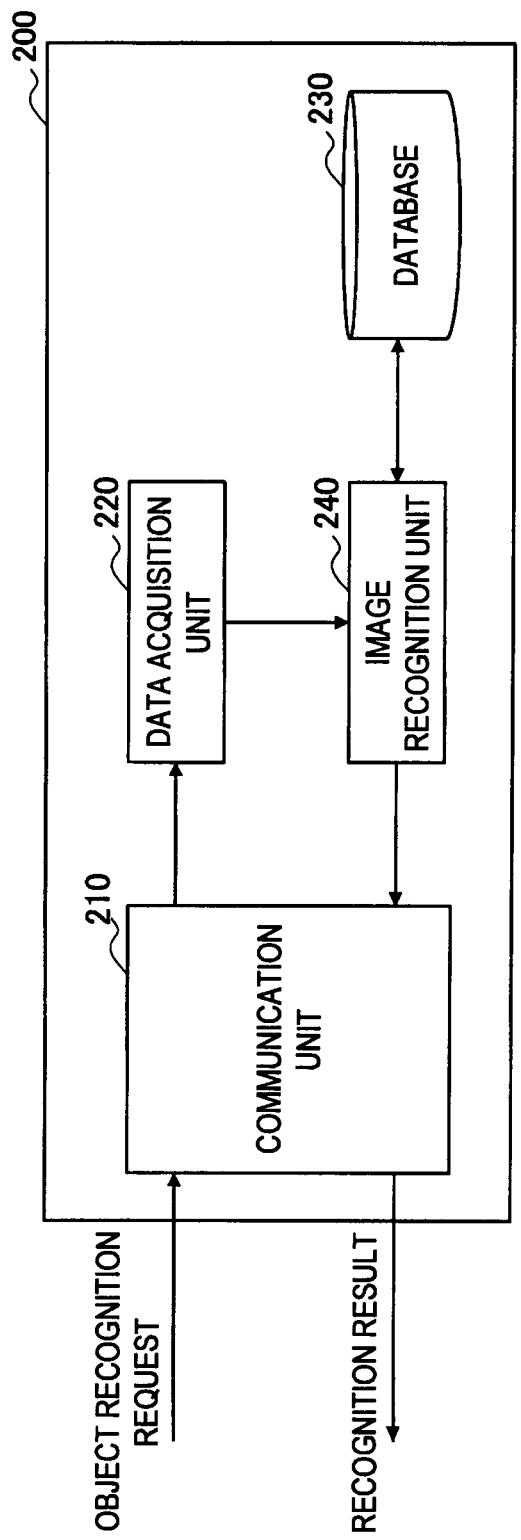
FIG. 4 is a block diagram showing an exemplary configuration of an object recognition server in accordance with the first embodiment.

FIG. 4 is a block diagram showing an exemplary configuration of the object recognition server 200 in accordance with the first embodiment. Referring to FIG. 4, the object recognition server 200 includes a communication unit 210, a data acquisition unit 220, a database 230, and an image recognition unit 240.

(Communication Unit)

The communication unit 210 communicates with the terminal device 100 via the network 3. For example, the communication unit 210 receives the aforementioned object recognition request transmitted from the terminal device 100. The object recognition request includes an input image captured by the imaging unit 120 of the terminal device 100 or another imaging device, or feature quantities determined from the input image. When an object in the input image is recognized by the image recognition unit 240 in response to the object recognition request, the communication unit 210 transmits information about the object to the terminal device 100.

(Data Acquisition Unit)

The data acquisition unit 220 acquires the aforementioned input image or the feature quantities determined from the input image received by the communication unit 210. Then, the data acquisition unit 220 outputs the acquired input image or feature quantities to the image recognition unit 240. Note that the data acquisition unit 220 may acquire the input image or the feature quantities not via the communication unit 210 but from an imaging device or a storage medium directly connected to the object recognition server 200, for example.

(Database)

The database 230 is a database that stores the feature quantities of two or more images, using a storage medium such as semiconductor memory or a hard disk. In the database 230, identification information for identifying an object in each image and attribute values related to the lighting conditions under which the object was imaged are associated with the feature quantities of each image. The database 230 stores a plurality of images of an identical object captured under different lighting conditions.

FIG. 5 is an explanatory diagram showing an exemplary structure of the database 230 in accordance with this embodiment. Referring to FIG. 5, the database 230 has seven data items: "object ID," "feature quantity ID," "place," "date," "time," "weather," and "feature quantity set." The "object ID" is an identifier for identifying an object in each image learned in advance. Instead of the character string of the identifier exemplarily shown in FIG. 5, position coordinates representing the position of the object may also be used as the identification information. The "feature quantity ID" is an identifier for uniquely identifying a feature quantity set stored in the database 230. In this embodiment, a plurality of "feature quantity IDs" can exist for a single "object ID." The "place," "date," "time," and "weather" are attributes associated with each feature quantity set. The "place" is the position coordinates of a place (a point or an area) where an image corresponding to each feature quantity set was captured. The "date" is the date when an image corresponding to each feature quantity set was captured. The "time" is the time when an image corresponding to each feature quantity set was captured. The "weather" represents the weather in which an image corresponding to each feature quantity set was captured. In the "feature quantity set," data on the entity of each feature quantity set is stored. Each feature quantity set may be a set of feature quantities determined from a learning image (an image including a known object) in accordance with SIFT or Random Ferns, for example.

In the example of FIG. 5, feature quantity IDs "F11," "F12," and "F13" are IDs of feature quantity sets of images of an identical object B1 located at an identical place. However, the three feature quantity sets differ in at least one of the date, time, or weather in which the corresponding image was captured. Such date, time, and weather are examples of the attributes related to the lighting conditions. As described above, the database 230 stores in advance the feature quantities of a plurality of images of an identical object captured under different lighting conditions. Note that in the database 230, attribute values need not be defined for some of the attribute items such as the place, date, time, and weather. In the example of FIG. 5, the values of the place, date, and time of the feature quantity ID "F31" are "any." Such data can be defined for, for example, a feature quantity set of an image of an object that can appear at a plurality of places such as a store of a franchise chain, a sign at a bus stop, or a traffic light.

(Image Recognition Unit)

The image recognition unit 240 recognizes an object in an input image by checking feature quantities determined from the input image against the feature quantities of each image stored in the database 230. For example, when an input image is acquired by the data acquisition unit 220, the image recognition unit 240 determines feature quantities from the input image in accordance with a feature quantity determination method such as SIFT or Random Ferns. Then, the image recognition unit 240 checks the determined feature quantities of the input image against the feature quantities of each image stored in the database 230. Then, the image recognition unit 240 recognizes, as a result of object recognition, the object ID of an object associated with the feature quantities that best match the feature quantities of the input image, and the position and attitude of the object. Alternatively, the image recognition unit 240 may recognize, as a result of object recognition, a list of the object IDs of a plurality of objects associated with feature quantities that match the feature quantities of the input image at a level higher than a given level, and the positions and attitudes of the objects. Then, the image recognition unit 240 causes the communication unit 210 to transmit information about the object in the input image, as a result of recognition, to the terminal device 100. The information transmitted to the terminal device 100 can include the object ID and the position and attitude of the object recognized by the image recognition unit 240 (or a list thereof), and additional information (e.g., information to be overlaid/displayed on the object).

[1-4. Process Flow]

Figure 6:
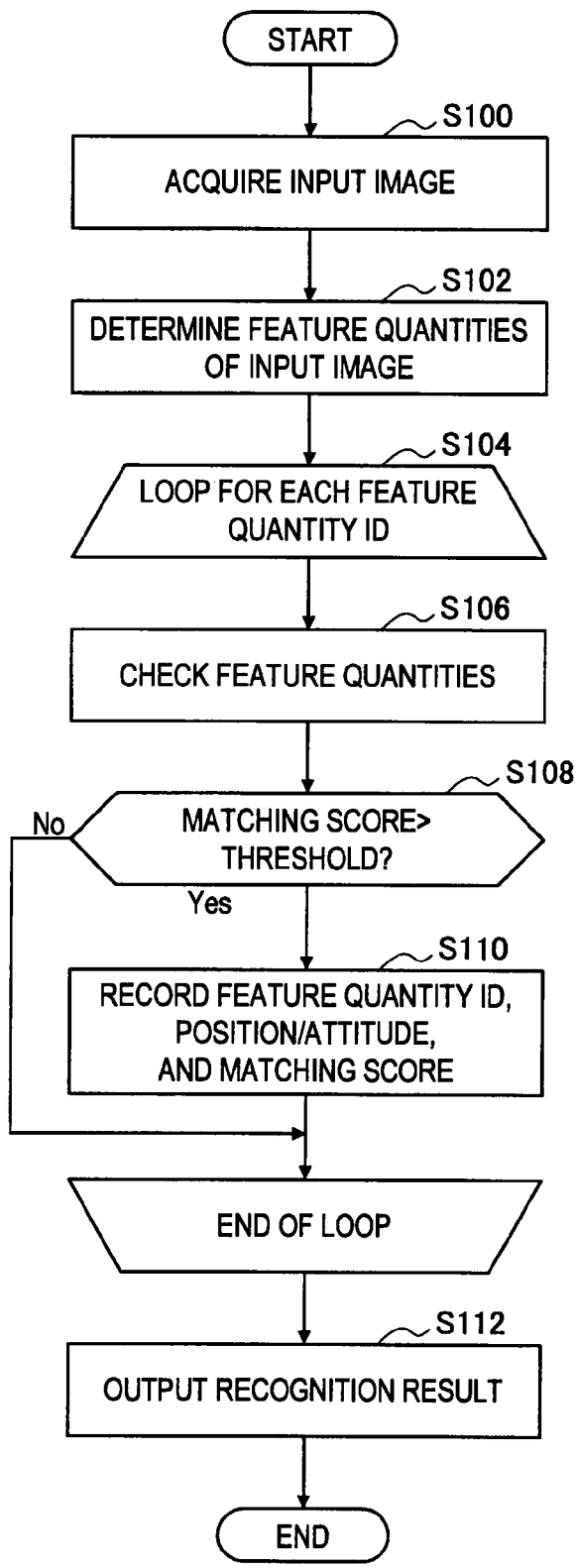
FIG. 6 is a flowchart showing an exemplary flow of an object recognition process in accordance with the first embodiment.

FIG. 6 is a flowchart showing an exemplary flow of an object recognition process performed by the object recognition server 200 in accordance with this embodiment.

Referring to FIG. 6, first, the data acquisition unit 220 acquires an input image included in an object recognition request transmitted from the terminal device 100 (step S100). Next, the image recognition unit 240 determines feature quantities from the input image acquired by the data acquisition unit 220 (step S102). Note that when the object recognition request includes the feature quantities of the input image, the data acquisition unit 220 can acquire the feature quantities of the input image instead of steps S100 and S102.

Next, the image recognition unit 240 repeats the processes from step S106 to step S110 for each feature quantity ID stored in the database 230 (step S104).

In step S106, the image recognition unit 240 checks the feature quantities of the input image determined in step S102 against a set of feature quantities (hereinafter referred to as "focused feature quantities") acquired from the database 230 (step S106). The image recognition unit 240 performs, in the checking process, three-dimensional affine transformation of feature point coordinates included in the focused feature quantities, and determines the position and attitude of an object whose feature point coordinates after the transformation best match the feature point coordinates of the input image, for example. In addition, the image recognition unit 240 computes a matching score that represents the degree of match of the feature quantities at that position and attitude. Then, the image recognition unit 240 determines if the computed matching score is above a predetermined threshold (step S108). Herein, if the matching score is above the threshold, the image recognition unit 240 temporarily stores into memory the feature quantity ID of the focused feature quantities and the position and attitude, as well as the matching score (step S110).

After that, upon termination of a loop for a plurality of feature quantity IDs stored in the database 230, the image recognition unit 240 outputs the result of object recognition to the communication unit 210 on the basis of the list of the feature quantity IDs temporarily stored in the memory (step S112). The result of object recognition output herein can include the object ID associated with the feature quantity ID whose matching score ranks first (or object IDs associated with the feature quantity IDs whose matching scores rank first to N-th), the corresponding position and attitude, and additional information.

[1-5. Conclusion of First Embodiment]

Heretofore, the terminal device 100 and the object recognition server 200 in accordance with the first embodiment have been described in detail with reference to FIGS. 1 to 6. According to this embodiment, the object recognition server 200 has a database that stores the feature quantities of two or more images while associating them with attribute values related to the lighting conditions. The object recognition server 200, upon receiving an object recognition request from the terminal device 100, checks feature quantities determined from the input image against the feature quantities of each image stored in the database. The database includes the feature quantities of a plurality of images of an identical object captured under different lighting conditions. Thus, even in a circumstance where the lighting conditions under which an input image is captured change in various ways, the probability that the input image matches a learned image, which has been captured under any one of the lighting conditions, will increase, and thus, an object in the input image can be recognized more accurately.

<2. Second Embodiment>

In the aforementioned first embodiment, the feature quantities of a plurality of images of a single object captured under different lighting conditions are stored in the database in advance. In this case, the time required for the feature quantity checking process for object recognition becomes long. Thus, in this section, a mechanism for reducing the time required for the checking process will be described as the second embodiment.

[2-1. Exemplary Configuration of Terminal Device]

Figure 7:
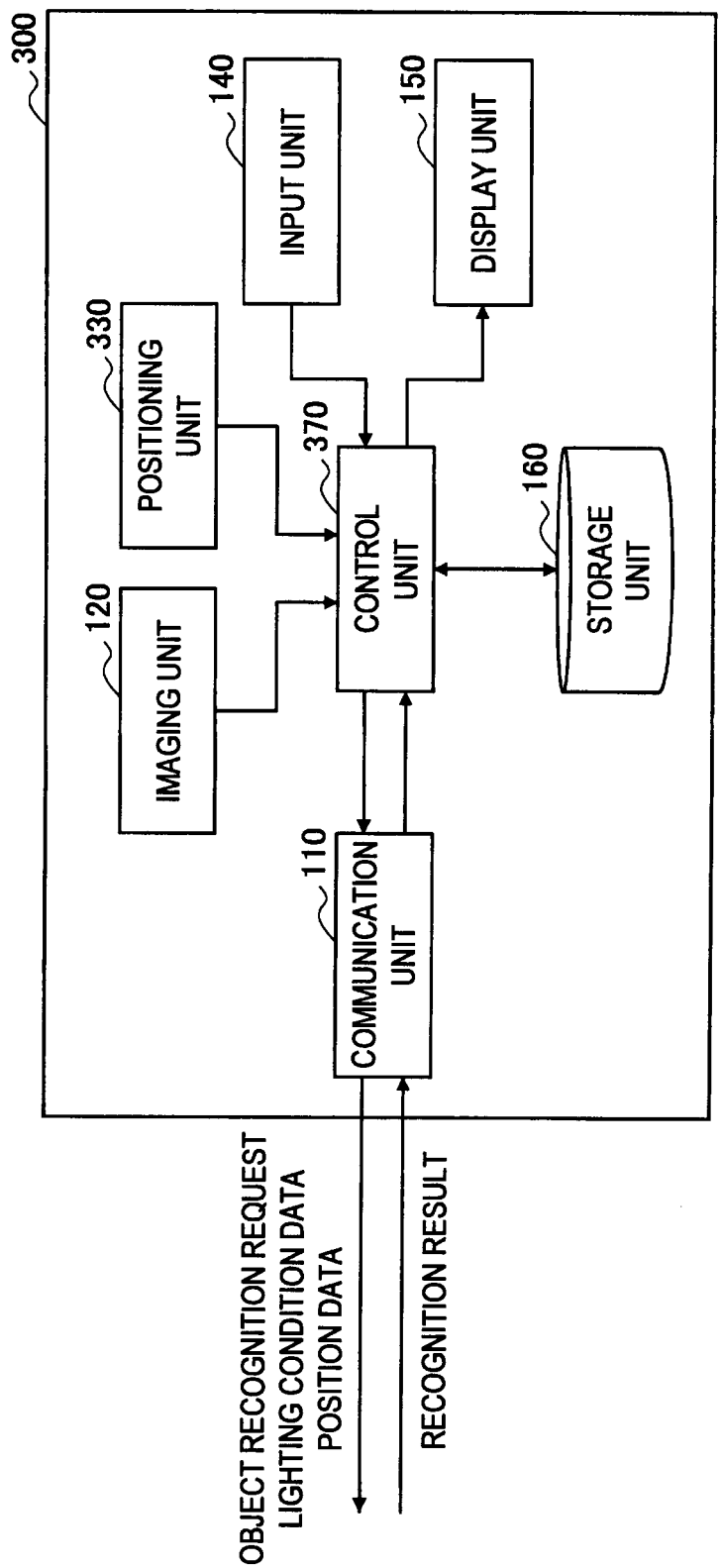
FIG. 7 is a block diagram showing an exemplary configuration of a terminal device in accordance with the second embodiment.

FIG. 7 is a block diagram showing an exemplary configuration of a terminal device 300 in accordance with the second embodiment. Referring to FIG. 7, the terminal device 300 includes a communication unit 110, an imaging unit 120, a positioning unit 330, an input unit 140, a display unit 150, a storage unit 160, and a control unit 370.

The positioning unit 330 is a positioning module that measures the position of the imaging unit 120 of the terminal device 300. For example, the positioning unit 330 may be a GPS module that measures the latitude, the longitude, and the altitude of the terminal device 300 upon receiving a GPS (Global Positioning System) signal. Alternatively, the positioning unit 330 may be a positioning sensor that measures the position of the terminal device 300 on the basis of the intensity of a radio signal received from a wireless access point. Further, the positioning unit 330 may include a geomagnetic sensor that measures the orientation of the lens of the imaging unit 120.

Like the control unit 170 in accordance with the first embodiment, the control unit 370 causes the overall functions of the terminal device 300 to operate by executing the programs stored in the storage unit 160 or another storage medium. In addition, in this embodiment, the control unit 370 can add data for assisting in increasing the efficiency of an object recognition process performed by an object recognition server 400 to an object recognition request transmitted from the communication unit 110 to the object recognition server 400. For example, as described below with reference to a specific example, position data representing the position measured by the positioning unit 330 can be added to the object recognition request. The position data may include orientation data representing the orientation of the imaging unit 120. In addition, data such as the date and time or weather related to the lighting conditions under which the input image was captured can also be added to the object recognition request.

[2-2. Exemplary Configuration of Server]

Figure 8:
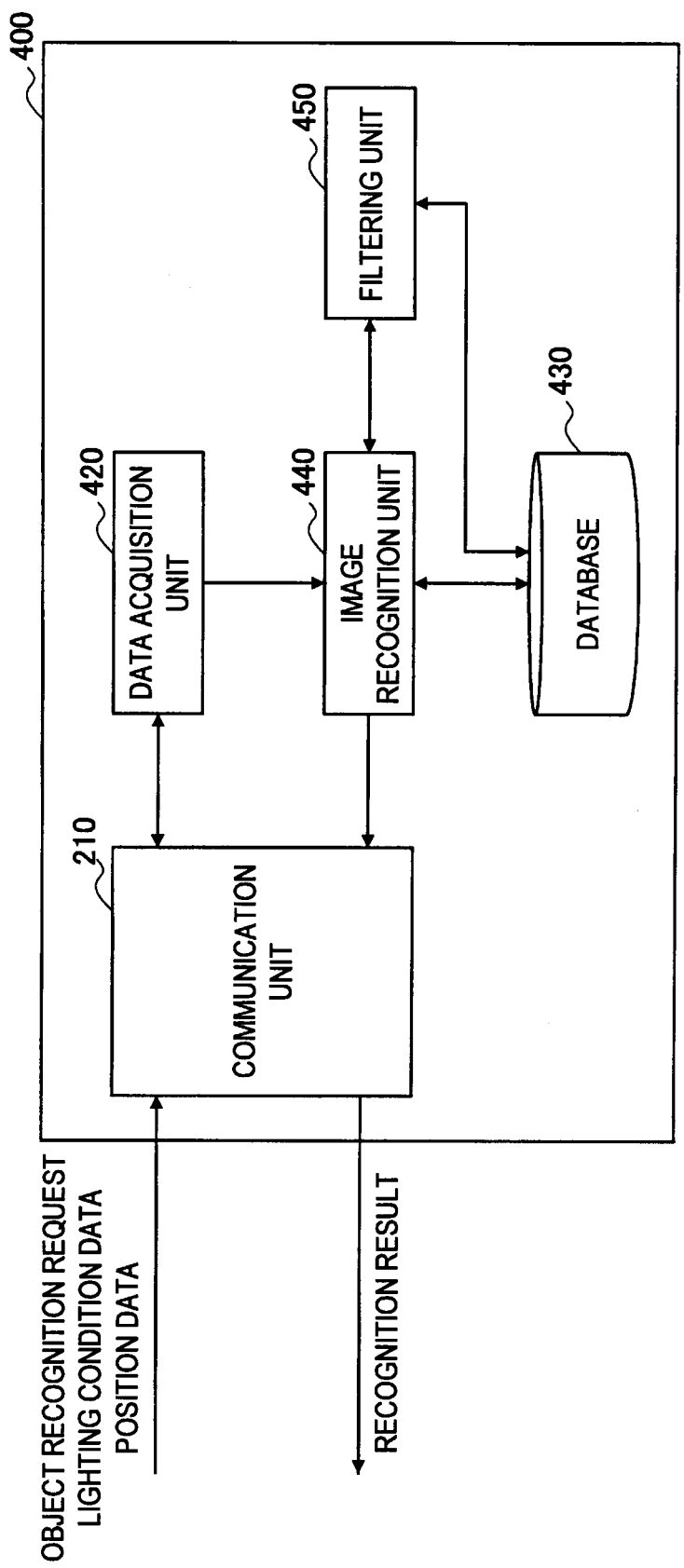
FIG. 8 is a block diagram showing an exemplary configuration of an object recognition server in accordance with the second embodiment.

FIG. 8 is a block diagram showing an exemplary configuration of the object recognition server 400 in accordance with the second embodiment. Referring to FIG. 8, the object recognition server 400 includes a communication unit 210, a data acquisition unit 420, a database 430, an image recognition unit 440, and a filtering unit 450.

(Data Acquisition Unit)

Like the data acquisition unit 220 of the object recognition server 200 in accordance with the first embodiment, the data acquisition unit 420 acquires an input image or feature quantities of the input image included in an object recognition request received by the communication unit 210. In this embodiment, the data acquisition unit 420 further acquires lighting condition data representing the lighting conditions under which the input image was captured. The data acquisition unit 420 may acquire the lighting condition data from the terminal device 300 via the communication unit 210. Alternatively, the data acquisition unit 420 may acquire the lighting condition data from another device in response to an object recognition request. Three examples of a method of acquiring lighting condition data with the data acquisition unit 420 will be described with reference to FIGS. 9A to 9C.

FIG. 9A is an explanatory diagram illustrating a first example of a method of acquiring lighting condition data. Referring to FIG. 9A, the terminal device 300 transmits an object recognition request including only an input image (or feature quantities of the input image) to the object recognition server 400. The data acquisition unit 420 of the object recognition server 400, upon receiving the object recognition request, accesses an external time server such as an NTP (Network Time Protocol) (or refers to a clock in the server), and acquires the reception date and time of the input image. Then, the data acquisition unit 420 determines the lighting condition data in accordance with the acquired reception date and time.

FIG. 9A shows exemplary lighting condition data 422a. The lighting condition data 422a has two data items: "date" and "time of day." The "date" is the date when the input image was received. The "time of day" is a segment representing the time of day to which the reception time of the input image belongs. As an example, the "time of day" can be segmented as follows.

—Segmentation of the Time of Day—
1: before dawn (0 to 3 o'clock)
2: at dawn (3 o'clock to sunrise)
3: in the morning (sunrise to 9 o'clock)
4: before noon (9 to 12 o'clock)
5: in the early afternoon (12 to 15 o'clock)
6: in the evening (15 o'clock to sunset)
7: at night (sunset to 21 o'clock)
8: at midnight (21 to 24 o'clock)

Figure 9B:
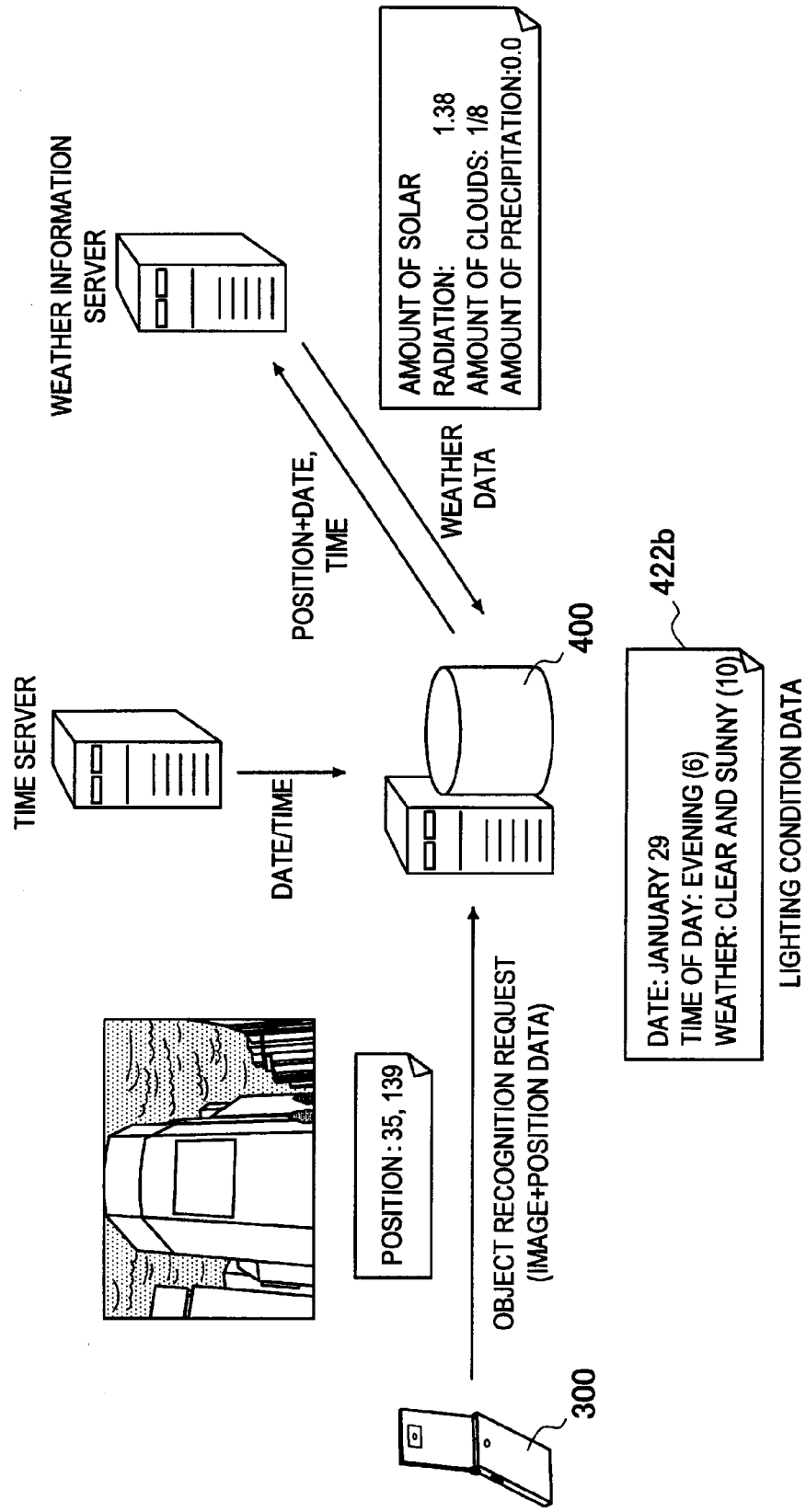
FIG. 9B is an explanatory diagram illustrating a second example of a method of acquiring lighting condition data.

FIG. 9B is an explanatory diagram illustrating a second example of a method of acquiring lighting condition data. Referring to FIG. 9B, the terminal device 300 transmits an object recognition request including an input image (or feature quantities of the input image) and position data to the object recognition server 400. The data acquisition unit 420 of the object recognition server 400, upon receiving the object recognition request, accesses an external time server or refers to a clock in the server, and acquires the reception date and time of the input image. Alternatively, the terminal device 300 may cause the object recognition request to further include the date and time when the input image was captured. The position data included in the object recognition request represents the position of the imaging device that has captured the input image (e.g., latitude and longitude of the imaging device; hereinafter referred to as "imaging position"). Next, the data acquisition unit 420 accesses an external weather information server and acquires weather data representing the weather at the imaging position at the date and time when the input image was captured or acquired. The weather data can include data such as the amount of solar radiation, the amount of clouds, and the amount of precipitation per hour. Then, the data acquisition unit 420 determines the lighting condition data in accordance with the acquired date and time and weather data.

FIG. 9B shows exemplary lighting condition data 422b. The lighting condition data 422b has three data items: "date," "time of day," and "weather." The "weather" may be a segment code derived by substituting the value of the amount of solar radiation, the amount of clouds, the amount of precipitation or the like included in the weather data into a predetermined function (e.g., ten-level values with the "clear and sunny" weather at the top).

FIG. 9C is an explanatory diagram illustrating a third example of a method of acquiring lighting condition data. Referring to FIG. 9C, a user, when transmitting an object recognition request from the terminal device 300 to the object recognition server 400, inputs information representing the current weather (e.g., ten-level segment codes with the "clear and sunny" weather at the top). Then, the terminal device 300 accesses an external time server or refers to a clock in the terminal, and acquires the date and time at that point in time. Then, the terminal device 300 transmits to the object recognition server 400 an object recognition request including an input image (or feature quantities of the input image), the date and time, and the weather data. The data acquisition unit 420 of the object recognition server 400 determines the lighting condition data upon receiving the object recognition request.

FIG. 9C shows exemplary lighting condition data 422c. The lighting condition data 422c has three data items: "date," "time of day," and "weather." The "date" is the date included in the object recognition request. The "time of day" is a segment representing the time of day to which the time included in the object recognition request belongs. The "weather" is a segment of weather included in the object recognition request.

Note that the data acquisition unit 420 may acquire the lighting condition data using another method, without limitation to the examples of FIGS. 9A to 9C. The lighting condition data acquired by the data acquisition unit 420 includes at least one of conditions related to the date or time when the input image was captured (hereinafter referred to as "time conditions") or conditions related to the weather in which the input image was captured (hereinafter referred to as "weather conditions"). The time conditions may include data of a type different from the date and the time of day (e.g., season, month, or week). In addition, the weather condition may be represented by a segment different from those exemplarily shown in FIGS. 9A to 9C.

(Database)

Like the database 230 in accordance with the first embodiment, the database 430 is a database that stores the feature quantities of two or more images. In the database 430, identification information for identifying an object in each image and attribute values related to the lighting conditions under which the object was imaged are also associated with the feature quantities of each image. The database 430 stores a plurality of images of an identical object captured under different lighting conditions.

FIG. 10 is an explanatory diagram showing an exemplary structure of the database 430 in accordance with this embodiment. Referring to FIG. 10, the database 430 has three data items: "date," "time of day," and "weather" as the attribute items related to the lighting conditions. The "date" is the date when an image corresponding to each feature quantity set was captured. The "time of day" is a segment of the time of day (e.g., the aforementioned 8-level segment codes) to which the time when an image corresponding to each feature quantity set was captured belongs. The "date" and the "time of day"

constitute the time conditions. The "weather" is a segment of weather (e.g., the aforementioned ten-level segment codes) when an image corresponding to each feature quantity set was captured. In the example of FIG. 10, only the "time of day" and the "weather" are indicated by segment codes.

(Image Recognition Unit)

Like the image recognition unit 240 of the object recognition server 200 in accordance with the first embodiment, the image recognition unit 440 recognizes an object in an input image by checking feature quantities determined from the input image against the feature quantities of each image stored in the database 430. Note that in this embodiment, the image recognition unit 440 checks only the feature quantities extracted by the filtering unit 450.

(Filtering Unit)

The filtering unit 450 extracts from the feature quantities of the images stored in the database 430 the feature quantities of an image captured under lighting conditions that are close to the lighting conditions represented by the lighting condition data acquired by the data acquisition unit 420. In this case, the filtering unit 450 may further extract only the feature quantities of an image for an object captured at a position close to the imaging position acquired by the data acquisition unit 420.

[2-3. Process Flow]

(Object Recognition Process)

Figure 11:
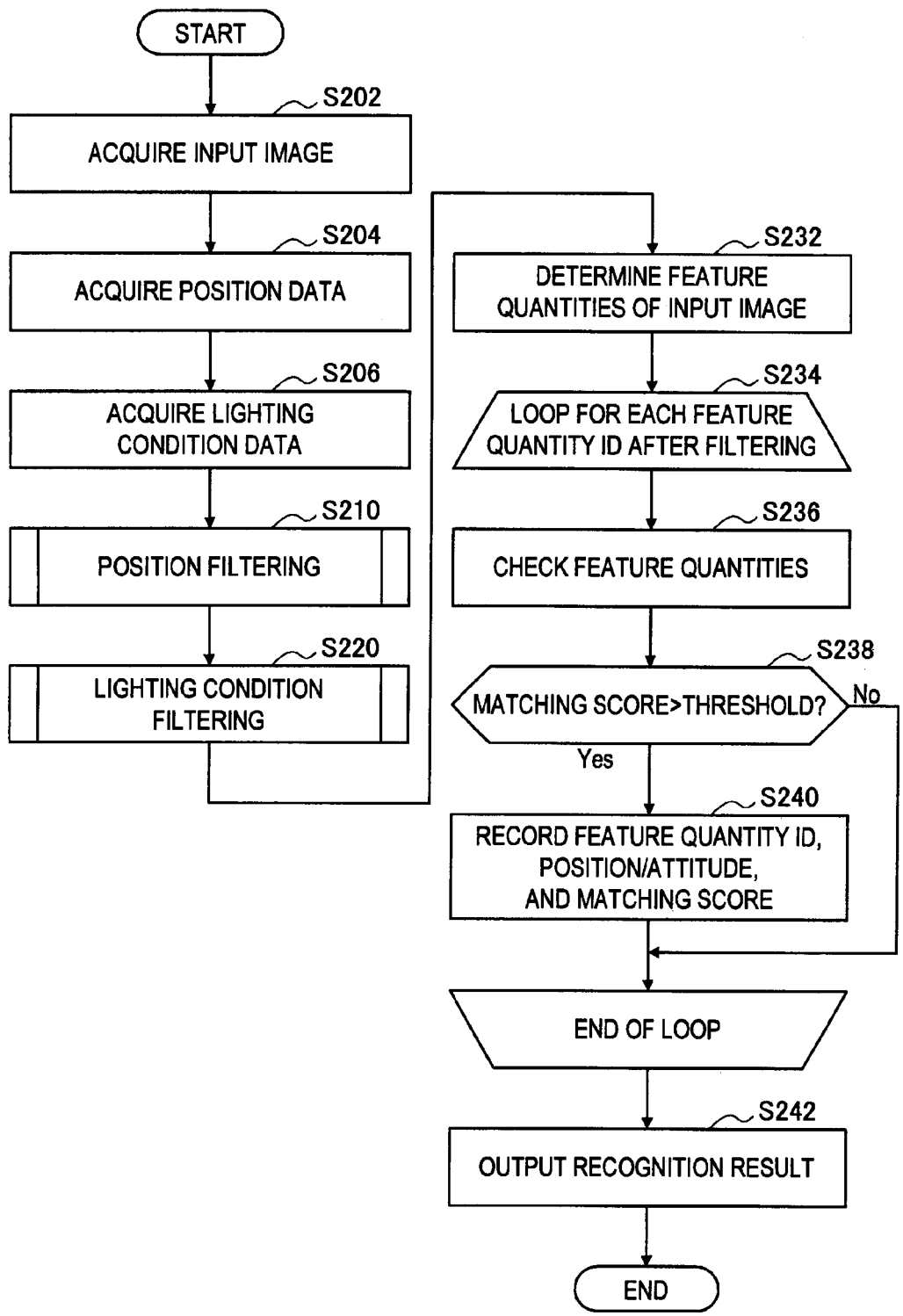
FIG. 11 is a flowchart showing an exemplary flow of an object recognition process in accordance with the second embodiment.

FIG. 11 is a flowchart showing an exemplary flow of an object recognition process performed by the object recognition server 400 in accordance with this embodiment.

Referring to FIG. 11, first, the data acquisition unit 420 acquires an input image included in an object recognition request transmitted from the terminal device 300 (step S202). When the object recognition request includes position data representing the position of the imaging device that has captured the input image, the data acquisition unit 420 also acquires the position data (step S204). Then, the data acquisition unit 420 acquires the lighting condition data (step S206).

Next, the filtering unit 450 executes a position filtering process described below, and extracts from the feature quantities of the images stored in the database 430 the feature quantities of images for objects that have been captured at positions close to the imaging position (step S210).

Next, the filtering unit 450 executes a lighting condition filtering process described below, and further extracts from the feature quantities of the images, which have been subjected to the position filtering process, the feature quantities of images captured at lighting conditions that are close to the lighting conditions represented by the lighting condition data (step S220).

Next, the image recognition unit 440 determines the feature quantities from the input image acquired by the data acquisition unit 420 (step S232). Note that when the object recognition request includes the feature quantities of the input image, the data acquisition unit 420 can acquire the feature quantities of the input image instead of steps S202 and S232.

Next, the image recognition unit 440 repeats the processes from step S236 to step S240 for each feature quantity ID included in the feature quantities of the images that have been subjected to the lighting condition filtering process (step S234).

In step S236, the image recognition unit 440 checks the focused feature quantities against the feature quantities of the input image determined in step S232 (step S236). Then, the image recognition unit 440 determines if a matching score computed as a result of checking is above a predetermined threshold (step S238). Herein, if the matching score is above the threshold, the image recognition unit 440 temporarily records the feature quantity ID of the focused feature quantities and the position and attitude as well as the matching score on the memory (step S240).

After that, upon termination of a loop for the feature quantity IDs, the image recognition unit 440 outputs the result of object recognition to the communication unit 210 on the basis of a list of feature quantity IDs temporarily recorded on the memory (step S242).

(Position Filtering Process)

Figure 12:
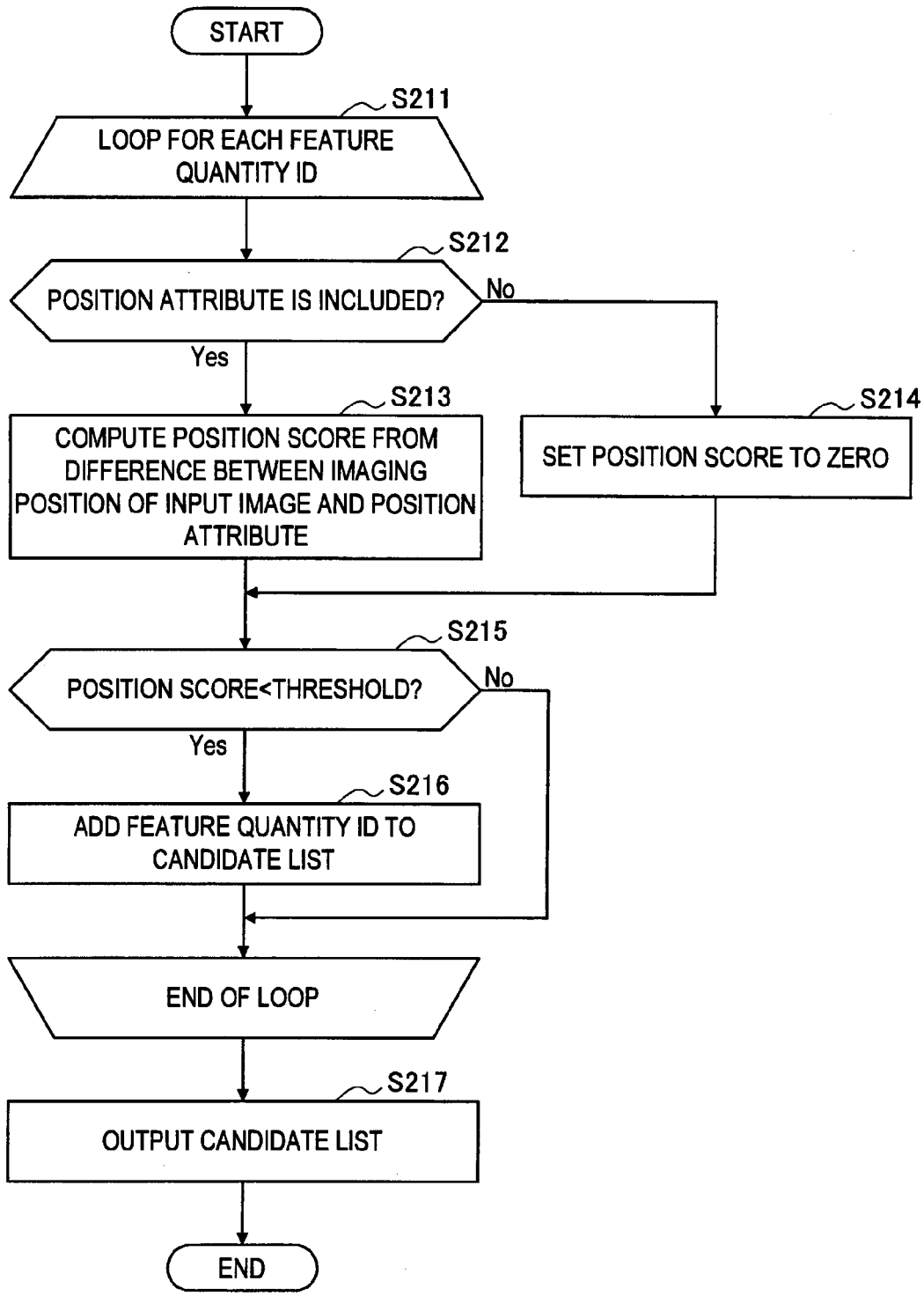
FIG. 12 is a flowchart showing an exemplary flow of a position filtering process.

FIG. 12 is a flowchart showing an exemplary flow of the position filtering process in step S210 of FIG. 11.

Referring to FIG. 12, the filtering unit 450 repeats the processes from step S212 to step S216 for each feature quantity ID stored in the database 430 (step S211).

In step S212, the filtering unit 450 determines if the data on the focused feature quantity ID includes the value of position attributes (step S212). The value of position attributes is represented by the item "place" in the data example of FIG. 10. In the example of FIG. 10, data on the feature quantity ID "F31" does not have the value of position attributes. If the data on the focused feature quantity ID includes the value of position attributes, the filtering unit 450 computes a position score from the difference between the position indicated by the position attributes of the focused feature quantity ID and the imaging position of the input image (step S213). Meanwhile, if the data on the focused feature quantity ID does not include the value of position attributes, the filtering unit 450 sets the position score to zero (step S214).

Next, the filtering unit 450 determines if the position score is below a predetermined threshold (step S215). Herein, if the position score is below the threshold, the filtering unit 450 adds the feature quantity ID of the focused feature quantities to a candidate list (step S216).

After that, upon termination of a loop for a plurality of feature quantity IDs stored in the database 430, the filtering unit 450 outputs the candidate list as a result of the position filtering process (step S217).

(Lighting Condition Filtering Process)

Figure 13:
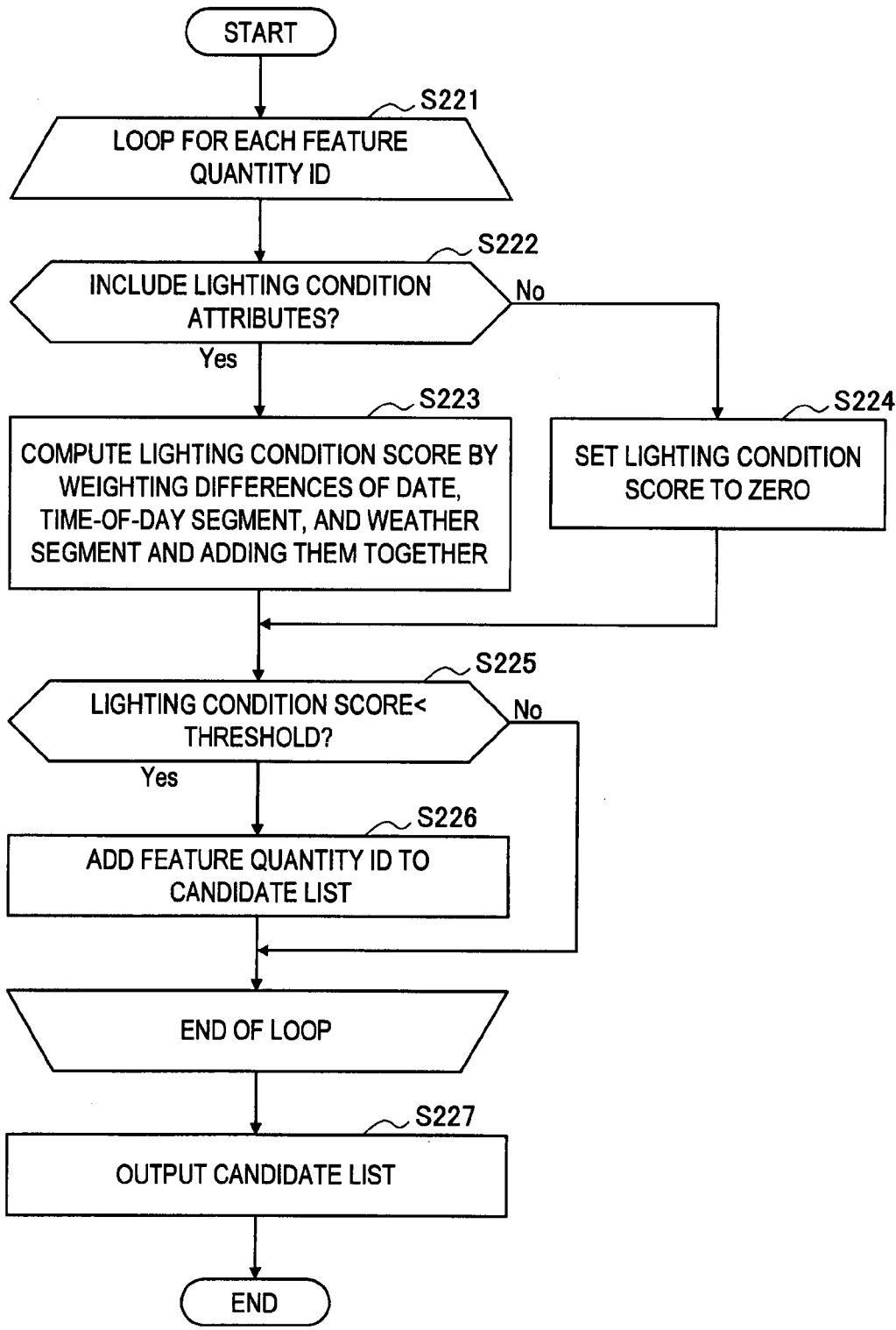
FIG. 13 is a flowchart showing an exemplary flow of a lighting condition filtering process.

FIG. 13 is a flowchart showing an exemplary flow of the lighting condition filtering process in step S220 of FIG. 11.

Referring to FIG. 13, the filtering unit 450 repeats the processes from step S222 to step S226 for each feature quantity ID included in the candidate list output by the position filtering process (step S221). Note that when the position filtering process is omitted, a process for each feature quantity ID stored in the database 430 is repeated.

In step S222, the filtering unit 450 determines if the data on the focused feature quantity ID includes the values of lighting condition attributes (step S222). If the data on the focused feature quantity ID includes the values of lighting condition attributes, the filtering unit 450 computes the difference between the attribute value of the focused feature quantities and the attribute value of the input image described in the lighting condition data, for each of the date, the segment of the time of day, and the segment of weather. Then, the filtering unit 450 computes a lighting condition score by weighting the difference values and adding them together (step S223). Meanwhile, if the data on the focused feature quantity ID does not include the values of lighting condition attributes, the filtering unit 450 sets the lighting condition score to zero (step S224).

Next, the filtering unit 450 determines if the lighting condition score is below a predetermined threshold (step S225). Herein, if the lighting condition score is below the threshold, the filtering unit 450 adds the feature quantity ID of the focused feature quantities to a candidate list (a new list different from the candidate list in the position filtering process) (step S226).

After that, upon termination of the loop, the filtering unit 450 outputs the new candidate list as a result of the lighting condition filtering process (step S227).

Note that the order of the processes performed by the object recognition server 400 is not limited to the order shown in the flowchart. For example, the object recognition server 400 may execute the lighting condition filtering process before the position filtering process. Alternatively, the object recognition server 400 may execute only one of the position filtering process or the lighting condition filtering process.

In addition, the filtering conditions in the position filtering process and the lighting condition filtering process are not limited to the aforementioned examples. For example, the filtering unit 450 may, instead of comparing a single lighting condition score with a threshold in the lighting condition filtering process, compare the difference value of each of the date, the segment of the time of day, and the segment of weather with each threshold. In that case, the filtering unit 450 can add the feature quantity ID of the focused feature quantities whose one, two, or three difference value(s) is/are below the threshold(s) to the candidate list.

(Examples of the Processing Results)

Figure 14:
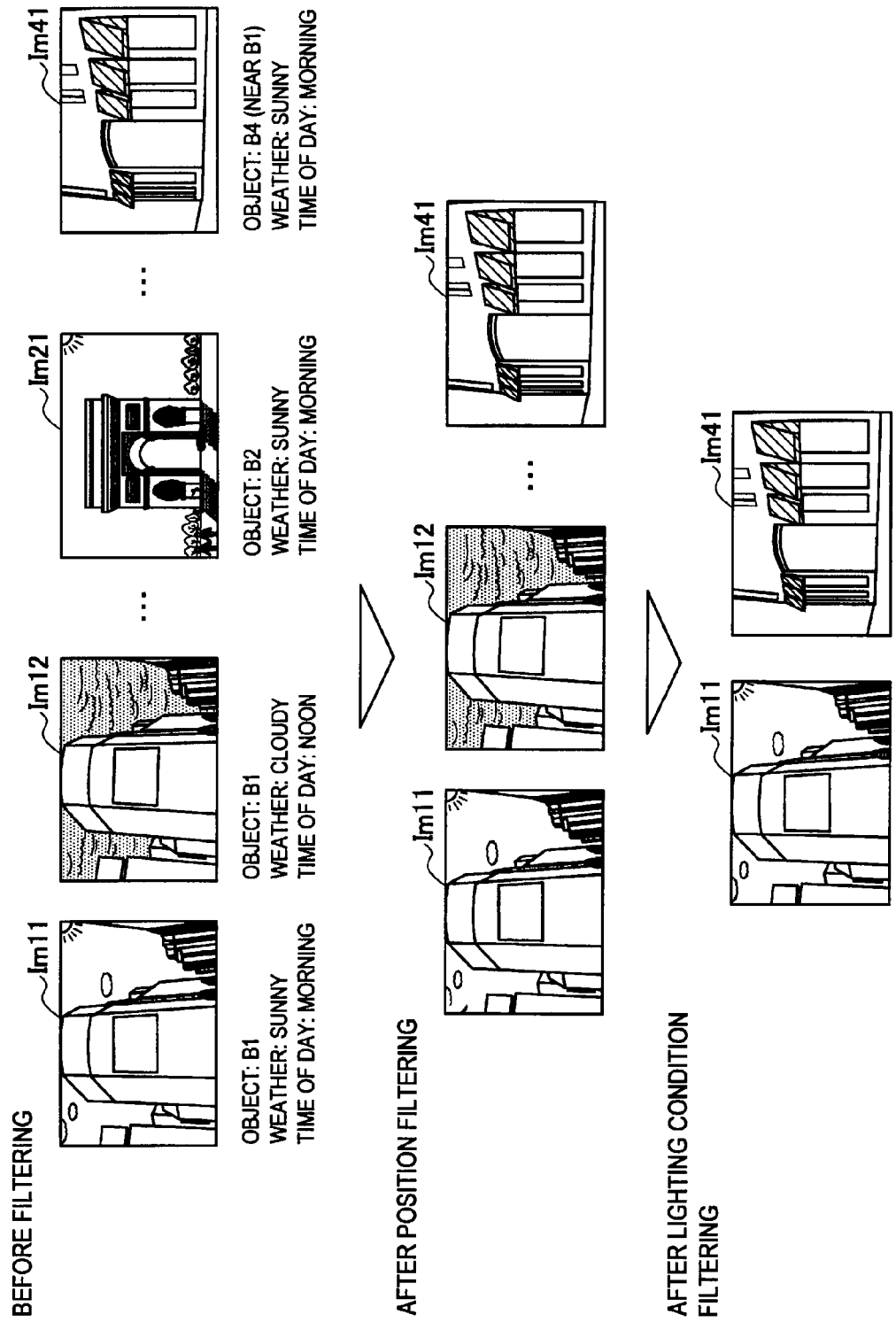
FIG. 14 is an explanatory diagram illustrating examples of filtering results.

FIG. 14 is an explanatory diagram illustrating examples of the results of the position filtering process and the lighting condition filtering process in this embodiment.

The upper views of FIG. 14 show images Im11, Im12, Im21, and Im41 that symbolically represent the feature quantities of four images stored in the database 430 before the position filtering process. The image Im11 is an image of an object B1 captured in the morning on a sunny day. The image Im12 is an image of the object B1 captured at noon on a cloudy day. The image Im21 is an image of an object B2 captured in the morning on a sunny day. The image Im41 is an image of the object B4 captured in the morning on a sunny day. Note that the object B4 is located near the object B1 in the real space.

Herein, it is assumed that an object recognition request including an input image of the object B1 is received from the terminal device 300 on a sunny day. The object recognition request includes position data indicating the imaging position near the object B1. In response to such object recognition request, the filtering unit 450 performs a position filtering process. Then, the feature quantities of the image Im21 of the object B2 that is not located near the object B1 are excluded from a candidate list. The middle views of FIG. 14 show that the images Im11, Im12, and Im41 remain after the position filtering process.

Further, the filtering unit 450 performs a lighting condition filtering process. Then, the feature quantities of the image Im12 captured on a cloudy day are excluded from the candidate list. The lower views of FIG. 14 show that only the images Im11 and Im41 remain after the lighting condition filtering.

Then, the image recognition unit 440 checks the feature quantities of the images Im11 and Im41 against the feature quantities determined from the input image, and recognizes that the input image includes the object B1.

[2-4. Conclusion of Second Embodiment]

Heretofore, the terminal device 300 and the object recognition server 400 in accordance with the second embodiment have been described in detail with reference to FIGS. 7 to 14. According to this embodiment, the feature quantities of images, which have been captured under lighting conditions that are close to the lighting conditions under which the input image was captured, are selectively extracted from the database prior to the object recognition performed by the object recognition server 400. Then, only the extracted feature quantities of the images are subjected to the object recognition process. The database includes the feature quantities of a plurality of images of an identical object captured under different lighting conditions. Thus, it is possible to increase the accuracy of recognition of an object in an input image while suppressing an increase in the time needed for a feature quantity checking process in a circumstance where the lighting conditions under which an input image is captured change in various ways.

The lighting conditions under which an input image was captured include at least one of the time conditions related to the date or time when each image was captured, or the weather conditions related to the weather in which each image was captured. Such conditions are conditions that have significant influence on the way in which an object in an image looks. Thus, by performing filtering on the basis of the closeness of the time conditions or weather conditions, it becomes possible to efficiently extract significant feature quantities of an image for object recognition.

Data on the time conditions and the weather conditions can be provided from the terminal device to the server or can be acquired by the server from a device different from the terminal device. When data on the time conditions and the weather conditions is acquired from a device different from the terminal device, implementation of the terminal device can be simplified. Thus, the aforementioned mechanism can be realized with a suppressed development cost.

Note that the object recognition severer 400 may also additionally register the feature quantities of an input image acquired from the terminal device 300 in the database 430 while associating them with the imaging position and the lighting conditions for the input image. In addition, in registration, it is also possible to check with a user if the result of object recognition has been correct and register the feature quantities of the input image in the database 430 only when a positive feedback is received.

<3. Third Embodiment>

In this section, a mechanism for further reducing the time required for the checking process will be described as the third embodiment.

[3-1. Exemplary Configuration of Server]

Figure 15:
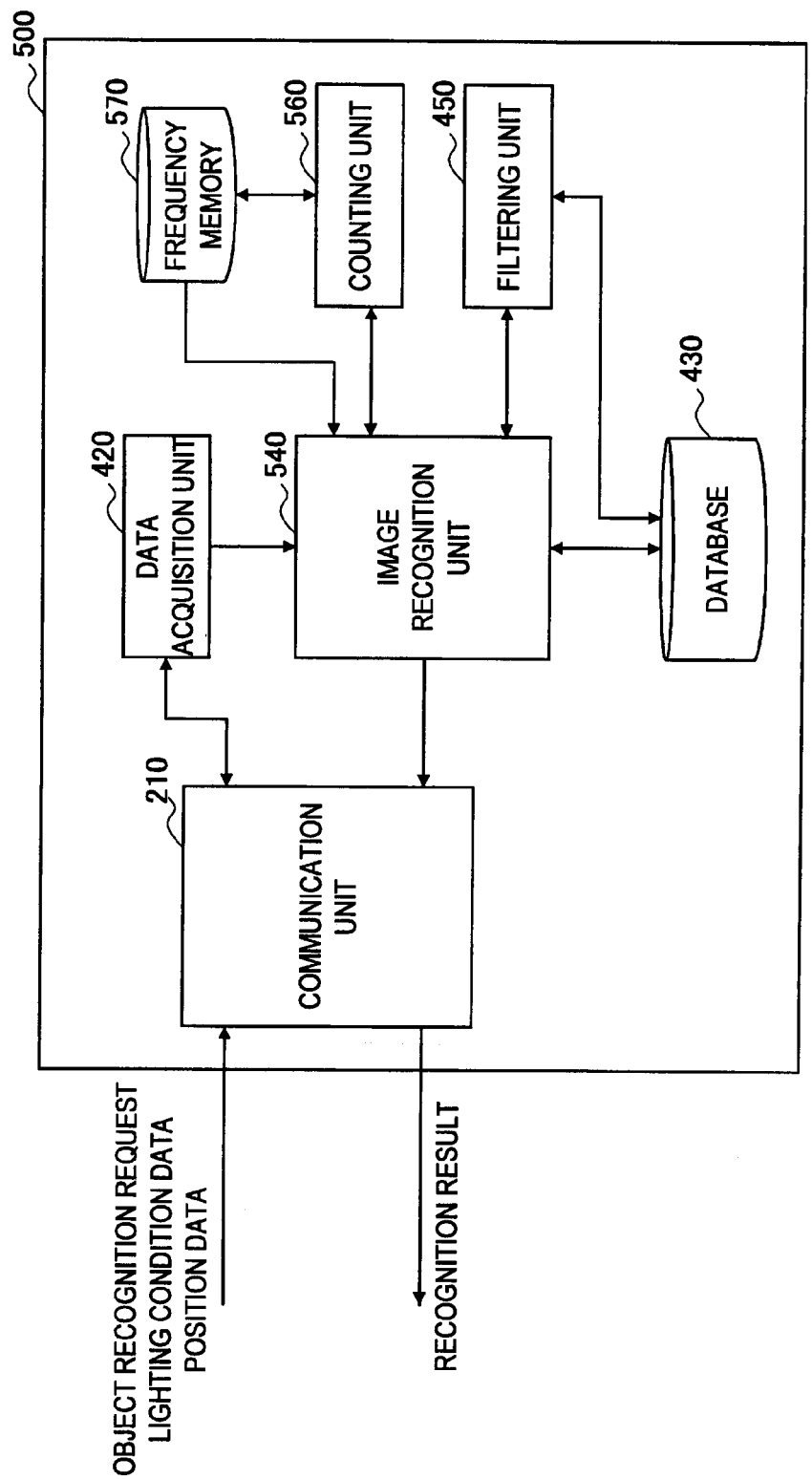
FIG. 15 is a block diagram showing an exemplary configuration of an object recognition server in accordance with the third embodiment.

FIG. 15 is a block diagram showing an exemplary configuration of the object recognition server 500 in accordance with the third embodiment. Referring to FIG. 15, the object recognition server 500 includes a communication unit 210, a data acquisition unit 420, a database 430, an image recognition unit 540, a filtering unit 450, a counting unit 560, and frequency memory 570.

(Counting Unit)

The counting unit 560 counts the frequency of recognition of each object performed by the image recognition unit 540 per predetermined unit related to the imaging position of the input image or the lighting conditions under which the input image was captured. The predetermined unit related to the imaging position may be, for example, an area obtained by dividing a geographical area in which the imaging device can be located, on a mesh. The predetermined unit related to the lighting conditions may be, for example, each segment of the time of day, each segment of weather, or a combination of them. Then, the counting unit 560 stores the frequency count data representing the result of counting into the frequency memory 570.

(Frequency Memory)

The frequency memory 570 stores the frequency count data, which represents the frequency of recognition of each object counted by the counting unit 560, using a storage medium such as semiconductor memory or a hard disk.

Referring to FIG. 16, frequency count data 572 is exemplarily shown. The frequency count data has four data items: "area ID," "lighting condition segment," "object ID," and "frequency. The "area ID" is an identifier for uniquely identifying each area obtained by the division. The "lighting condition segment" is a segment corresponding to a unit related to the lighting conditions. The "object ID" is the object ID of an object recognized by the image recognition unit 540. The "frequency" represents the value of frequency counted for a combination of the corresponding "area ID," "lighting condition segment," and "object ID."

(Image Recognition Unit)

Like the image recognition unit 240 of the object recognition server 200 in accordance with the first embodiment, the image recognition unit 540 recognizes an object in an input image by checking feature quantities determined from the input image against the feature quantities of each image stored in the database 430. In addition, in this embodiment, the image recognition unit 540 may also select only the feature quantities extracted by the filtering unit 450 as the target feature quantities to be checked. Further, in this embodiment, the image recognition unit 540 refers to the frequency of each object counted by the counting unit 560 for at least one of the imaging position or the lighting conditions corresponding to a newly acquired input image, and preferentially checks the feature quantities of an image of an object with high frequency against the feature quantities determined from the input image.

For example, in the frequency count data 572 exemplarily shown in FIG. 16, the frequency of the object B2 (50) counted by the counting unit 560 for an area $A_1$ and a lighting condition segment $L_1$ is the highest, that of the object B5 (10) is the second highest, and that of the object B7 (8) is the third highest. Thus, if a newly acquired input image is an image captured in the area $A_1$ under the lighting conditions belonging to the lighting condition segment $L_1$, the image recognition unit 540 preferentially checks the feature quantities of the image of the object B2 against the feature quantities of the input image. Then, if the preferentially checked feature quantities of the image indicate a matching score higher than a predetermined threshold, the image recognition unit 540 recognizes that the object indicating the matching score is included in the input image.

[3-2. Process Flow]

FIG. 17 is a flowchart showing an exemplary flow of an object recognition process performed by the object recognition server 500 in accordance with this embodiment.

Referring to FIG. 17, first, the data acquisition unit 420 acquires an input image included in an object recognition request transmitted from the terminal device 300 (step S302). Then, the data acquisition unit 420 acquires position data included in the object recognition request (step S304). Further, the data acquisition unit 420 acquires lighting condition data (step S306).

Next, the image recognition unit 540 acquires from the frequency memory 570 frequency count data corresponding to the area to which the imaging position belongs and the lighting condition segment, on the basis of the position data and the lighting condition data acquired by the data acquisition unit 420 (step S308). Next, the image recognition unit 540 sorts the objects IDs included in the acquired data in order of decreasing frequency (step S310).

Next, the image recognition unit 540 determines feature quantities from the input image acquired by the data acquisition unit 420 (step S312). Note that when the object recognition request includes the feature quantities of the input image, the data acquisition unit 420 can acquire the feature quantities of the input image instead of steps S302 and S312.

Next, the image recognition unit 540 acquires from the database 430 the feature quantities of an image corresponding to the top, unprocessed object ID within the frequency count data sorted in step S310 (step S314). The feature quantities of the image acquired herein may be the feature quantities of an image extracted by a lighting condition filtering process.

Next, the image recognition unit 540 checks the acquired feature quantities against the feature quantities of the input image determined in step S312 (step S316). Then, the image recognition unit 540 determines if a matching score computed as a result of checking is above a predetermined threshold (step S318). Herein, if the matching score is not above the threshold, the process returns to step S314, and a process is repeated for the feature quantities of an image corresponding to an object ID with the next highest frequency.

Meanwhile, if the matching score is above the threshold, the image recognition unit 540 recognizes that the object identified by the object ID that has been subjected to the checking process is included in the input image. Then, the image recognition unit 540 outputs the result of object recognition to the communication unit 210 (step S320). In addition, the counting unit 560, on the basis of the result of new object recognition, updates the frequency count data stored in the frequency memory 570 (step S322).

[3-3. Conclusion of Third Embodiment]

Heretofore, the object recognition server 500 in accordance with the third embodiment has been described in detail with reference to FIGS. 15 to 17. According to this embodiment, the frequency of recognition of each object is counted per predetermined unit related to the imaging position and the lighting conditions of the input image. Then, when a new input image is acquired, the feature quantities of an image of an object whose frequency, which has been counted for the imaging position or the lighting conditions corresponding to the input image, is high are preferentially checked against the feature quantities determined from the input image. That is, as the feature quantities of an image, which is statistically predicted to match the input image with high possibility, are checked against the feature quantities of the input image, it is possible to further reduce the time until the result of object recognition is output.

Note that when there exists a result of object recognition performed in the past for an input image captured at substantially the same place (and the same orientation of the imaging device), the image recognition unit 540 may provide the result of the object recognition performed in the past to the terminal device 300 that is the transmission source of the object recognition request as it is, without newly executing a feature quantity checking process.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Note that the terminal device and the object recognition server described in this specification may be a single unitary device. In addition, a series of the control processes performed by each device can be realized using any one of software, hardware, or a combination of software and hardware. A program that constitutes software is stored in a storage medium provided in or outside each device in advance. Then, each program is read into RAM (Random Access Memory) when executed, and is executed by a processor such as a CPU (Central Processing Unit).

The present disclosure contains subject matter related to that disclosed in Japanese Priority Patent Application JP 2011-067961 filed in the Japan Patent Office on Mar. 25, 2011, the entire content of which is hereby incorporated by reference.

What is claimed is:

1. An information processing device comprising:
a database that stores focused feature quantities of two or more reference images, the database being configured such that identification information for identifying an object in each reference image and an attribute value related to a lighting condition under which the object was imaged are associated with a focused feature quantity of each reference image;
an acquisition unit configured to acquire an input image captured by an imaging device; and
a recognition unit configured to recognize an object in the input image by checking a determined feature quantity determined from the input image against focused feature quantities of selected images of the reference images that have been selected as a targeted search subset,
wherein
the focused feature quantities stored in the database include focused feature quantities of a plurality of images of an identical object captured under different lighting conditions,
the acquisition unit further acquires lighting condition data representing a lighting condition under which the input image was captured,
the information processing device further comprises a filtering unit configured to create the targeted search subset by selecting and extracting, from the database, only those focused feature quantities of the selected images of the reference images that were captured under lighting conditions that are similar to the lighting condition represented by the lighting condition data based on at least one of similarly between time conditions related to date or time when each image was captured and similarly between weather conditions related to weather in which each image was captured,
the recognition unit checks the focused feature quantities of the selected images extracted by the filtering unit against the determined feature quantity determined from the input image, and the object in the input image is recognized when a matching score computed as a result of the checking is above a predetermined threshold, and
for the recognition unit to recognize the object in the input image, the recognition unit checks only the focused feature quantities of the selected images that have been selected for the targeted search subset without consideration of the focused feature quantities of images of the references image that have not been selected for the targeted search subset.

2. The information processing device according to claim 1, wherein the lighting condition includes a first condition related to the weather in which each of the reference images was captured.

3. The information processing device according to claim 2, wherein the acquisition unit acquires the lighting condition data for the first condition based on position data representing a position of the imaging device that has captured the input image and date and time when the input image was captured or acquired.

4. The information processing device according to claim 1, wherein the lighting condition includes a second condition related to the date or time when each of the reference images was captured.

5. The information processing device according to claim 1, further comprising a communication unit configured to receive the input image transmitted from a terminal device and transmit, to the terminal device, information about an object recognized by the recognition unit.

6. The information processing device according to claim 1, further comprising a communication unit configured to receive the input image transmitted from a terminal device and transmit, to the terminal device, information about an object recognized by the recognition unit, wherein
the acquisition unit acquires the lighting condition data from a source other than the terminal device.

7. The information processing device according to claim 1, wherein
in the database, another attribute value representing a position of the object in each reference image is further associated with the focused feature quantity of each reference image,
the acquisition unit further acquires position data representing a position of the imaging device that has captured the input image, and
the filtering unit extracts only focused feature quantities of the selected images for objects captured at positions that are close to the position of the imaging device represented by the position data.

8. The information processing device according to claim 1, wherein
the acquisition unit further acquires at least one of position data representing a position of the imaging device that has captured the input image or lighting condition data representing a lighting condition under which the input image was captured,
the information processing device further comprises a counting unit configured to count a frequency of recognition of each object performed by the recognition unit per predetermined unit related to the position of the imaging device or the lighting condition, and
the recognition unit refers to the frequencies counted by the counting unit for the position of the imaging device or the lighting condition corresponding to a newly acquired input image, and preferentially checks focused feature quantities of reference images of objects with high frequencies against the determined feature quantity determined from the input image.

9. An object recognition method in an information processing device including a database that stores focused feature quantities of two or more reference images, the database being configured such that identification information for identifying an object in each reference image and an attribute value related to a lighting condition under which the object was imaged are associated with a focused feature quantity of each reference image, and the stored focused feature quantities stored in the database including focused feature quantities of a plurality of images of an identical object captured under different lighting conditions, the object recognition method comprising:

acquiring an input image captured by an imaging device;

acquiring lighting condition data representing a lighting condition under which the input image was captured;

creating a targeted search subset by selecting and extracting, from the database, only those focused feature quantities of selected images of the reference images that were captured under lighting conditions that are similar to the lighting condition represented by the lighting condition data based on at least one of similarly between time conditions related to date or time when each image was captured and similarly between weather conditions related to weather in which each image was captured, and recognizing an object in the input image by checking a determined feature quantity determined from the input image against the focused feature quantities of the selected images, and the object in the input image is recognized when a matching score computed as a result of the checking is above a predetermined threshold, wherein the object in the input image is recognized by only checking the focused feature quantities of the selected images that have been selected for the targeted search subset without consideration of the focused feature quantities of images of the references image that have not been selected for the targeted search subset.

10. A non-transitory computer-readable medium having embodied thereon a program, which when executed by a computer that controls an information processing device including a database that stores focused feature quantities of two or more reference images, the database being configured such that identification information for identifying an object in each reference image and an attribute value related to a lighting condition under which the object was imaged are associated with a focused feature quantity of each reference image, causes the computer to function as:

an acquisition unit that acquires an input image captured by an imaging device; and a recognition unit configured to recognize an object in the input image by checking a determined feature quantity determined from the input image against focused feature quantities of selected images of the reference images that have been selected as a targeted search subset, and the object in the input image is recognized when a matching score computed as a result of the checking is above a predetermined threshold, wherein the stored focused feature quantities stored in the database include focused feature quantities of a plurality of images of an identical object captured under different lighting conditions, the acquisition unit further acquires lighting condition data representing a lighting condition under which the input image was captured, the information processing device further comprises a filtering unit configured to create the targeted search subset by selecting and extracting, from the database, only those focused feature quantities of selected images of the reference images that were captured under lighting conditions that are similar to the lighting condition represented by the lighting condition data based on at least one of similarly between time conditions related to date or time when each image was captured and similarly between weather conditions related to weather in which each image was captured, the recognition unit checks the focused feature quantities of the selected images extracted by the filtering unit against the determined feature quantity determined from the input image, and for the recognition unit to recognize the object in the input image, the recognition unit checks only the focused feature quantities of the selected images that have been selected for the targeted search subset without consideration of the focused feature quantities of images of the references image that have not been selected for the targeted search subset.

11. A terminal device comprising:

a communication unit configured to communicate with an information processing device including a database that stores focused feature quantities of two or more reference images, the database being configured such that identification information for identifying an object in each reference image and an attribute value related to a lighting condition under which the object was imaged are associated with a respective focused feature quantity corresponding to each reference image, and the database storing focused feature quantities of a plurality of images of an identical object captured under different lighting conditions; and a control unit configured to transmit from the communication unit to the information processing device an input image captured by an imaging device or a determined feature quantity determined from the captured input image, and data about a lighting condition under which the input image was captured, wherein the information processing device creates a targeted search subset by selecting and extracting, from the database, only those focused feature quantities of selected images of the reference images that were captured under lighting conditions that are similar to the lighting condition represented by the data about the lighting condition based on at least one of similarity between time conditions related to date or time when each image was captured and similarly between weather conditions related to weather in which each image was captured, wherein the extracted focused feature quantities of the selected images are checked against the determined feature quantity determined from the captured input image, to recognize an object that is present within the captured input image, and the object present within the captured input image is recognized when a matching score computed as a result of the checking is above a predetermined threshold, and wherein, for the object in the input image to be recognized, only the extracted focused feature quantities of the selected images that have been selected for the targeted search subset are checked against the determined feature quantity without consideration of the focused feature quantities of images of the references image that have not been selected for the targeted search subset.

12. The terminal device according to claim 11, wherein the control unit, when executing an augmented reality application, transmits from the communication unit to the information processing device the captured input image or the determined feature quantity and the data about the lighting condition.

13. The information processing device according to claim 1, wherein the targeted search subset is created by selecting and extracting the focused feature quantities of the selected images based on at least one of a similarity between a time of day of capture of respective reference images and a time of day of capture of the input image, and a similarity between a weather condition at a time of capture of respective reference images and a weather condition at a time of capture of the input image.

* * * * *